US012500074B2

(12) United States Patent
Chen et al.

(10) Patent No.: US 12,500,074 B2

(45) Date of Patent: Dec. 16, 2025

(54) CHARACTERIZING QUADRUPOLE TRANSMITTING WINDOW IN MASS SPECTROMETERS

(71) Applicant: Agilent Technologies, Inc., Santa Clara, CA (US)

(72) Inventors: Kai Chen, Shanghai (CN); Kenneth R. Newton, Concord, CA (US); Christian Wisner-Carlson, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 813 days.

(21) Appl. No.: 17/730,032

(22) Filed: Apr. 26, 2022

(65) Prior Publication Data

US 2023/0343574 A1 Oct. 26, 2023

(51) Int. Cl.

*H01J 49/42* (2006.01)

*H01J 49/00* (2006.01)

(52) U.S. Cl.

CPC ...... *H01J 49/4215* (2013.01); *H01J 49/0009* (2013.01); *H01J 49/0031* (2013.01); *H01J 49/0045* (2013.01)

(58) Field of Classification Search

CPC ......... H01J 49/427–429; H01J 49/0036; H01J 49/421–4215; H01J 49/0031; H01J 49/004; H01J 49/06; H01J 49/40; H01J 49/0027; H01J 49/0009; H01J 49/063

See application file for complete search history.

(56) References Cited

U.S. PATENT DOCUMENTS

| | | | | |
|---|---|---|---|---|
| 8,481,926 | B2 | 7/2013 | Loboda | |
| 9,685,312 | B2 | 6/2017 | Tate et al. | |
| 2017/0299550 | A1 * | 10/2017 | Wang | H01J 49/004 |

OTHER PUBLICATIONS

Agilent 7250 Accurate-Mass Quadrupole Time-of-Flight GC/MS System Concepts Guide; Agilent Technologies, Inc; Jul. 2017; 42 pages.

* cited by examiner

*Primary Examiner* — Michael J Logie

(74) *Attorney, Agent, or Firm* — Mannava & Kang, P.C.

(57) ABSTRACT

A quadrupole transmitting window applied by a quadrupole mass filter is characterized by a method that utilizes the noise band of a transmitted chemical noise ion signal. The mass filter may be utilized in a mass spectrometry (MS) system.

20 Claims, 9 Drawing Sheets transmission probability
covered mass range
300
m/z transmission probability
covered mass range
300
m/z transmission probability
covered mass range
300
m/z transmission probability
covered mass range
300
m/z

CHARACTERIZING QUADRUPOLE TRANSMITTING WINDOW IN MASS SPECTROMETERS

TECHNICAL FIELD

The present invention relates generally to the transmission of ions through a quadrupole mass filter, as may be done in a mass spectrometry (MS) system. More specifically, the invention relates to the characterization of the transmission window implemented by a quadrupole mass filter for purposes such as tuning or calibration of the quadrupole mass filter.

BACKGROUND

A mass spectrometry (MS) system in general includes an ion source for ionizing components of a sample under investigation, a mass analyzer for separating the gas-phase ions based on their differing mass-to-charge ratios (or m/z ratios, or more simply "masses"), an ion detector for counting the separated ions, and electronics for processing output signals from the ion detector as needed to produce a user-interpretable mass spectrum. Typically, the mass spectrum is a series of peaks indicative of the relative abundances of detected ions as a function of their m/z ratios. The mass spectrum may be utilized to determine the molecular structures of components of the sample, thereby enabling the sample to be qualitatively as well as quantitatively characterized.

An MS system may include at least two mass analyzers. The first mass analyzer is configured as a linear quadrupole ion guide that is operated as a bandpass mass filter. A linear quadrupole ion guide consists of a set of four parallel rod-shaped electrodes positioned at a radial distance from a central axis (i.e., the main optical axis of ion transmission), and spaced around the central axis so as to surround an axially elongated ion guide volume leading from an ion entrance end to an axially opposite ion exit end. To implement mass filtering, both radio frequency (RF) potentials and direct current (DC) potentials are applied to the ion guide electrodes so as to generate a composite RF/DC electric field. The RF/DC electric field is effective for limiting the motions of ions of selected masses in directions radial (transverse) to the central axis. Under the constraints imposed by this ion confining field, ions transmitted through the entrance end travel through the ion guide volume in complex trajectories around the central axis and generally in the resultant direction of the exit end. However, the operating parameters of the RF/DC field are set so as to impose mass-dependent stability limits on the motions of ions in the ion guide volume. The result is that only ions of masses in a selected range (Δ m/z) are able to travel through the entire axial length of the ion guide in stable trajectories focused along the central axis, and thereby pass through the exit end. The selected mass range, or passband, is defined between (and includes) a low mass cutoff (low m/z value) and a high mass cutoff (high m/z value). The mass range corresponds to a quadrupole transmission window, which is set by the user of the MS instrument or otherwise programmed into the electronics of the MS instrument. On the other hand, ions of other (non-selected) masses have unstable trajectories. The amplitude of the radial oscillations of unstable ions grows as they travel through the quadrupole until they are no longer able to be contained by the ion confining field. Consequently, these non-selected, unstable ions are removed from the ion guide volume (such as by colliding with the rod-shaped electrodes) and thus do not reach the exit end of the ion guide.

The second (or final) mass analyzer, downstream from the first mass analyzer, is configured to perform mass analysis by transmitting ions of selected masses to the ion detector. For this purpose, the final mass analyzer may also be configured as a linear quadrupole ion guide that generates a composite RF/DC electric field. However, other types of final mass analyzers may be utilized, such as a time-of-flight (TOF) analyzer, which exhibits high mass resolution in comparison to many other types of mass analyzers. A TOF analyzer includes a flight tube, in which ions of differing masses travel at different velocities and thus separate (spread out) according to their differing masses, enabling mass resolution based on differing times-of-flight. The times-of-flight are measured by the ion detector, and then correlated to respective ion mass values by the electronics of the MS system.

The above-noted quadrupole mass filter is commonly utilized as a narrow band filter. That is, the quadrupole transmission window imposed by the mass filter is set to have a narrow window width, Δ m/z, defined by low and high m/z values at the respective edges of the window. This may be done to isolate a selected target range of ion masses (within the operative narrow transmission window) for analysis and detection/measurement. It also may be done to analyze a larger mass range by successively selecting/filtering and analyzing ions in different narrow mass ranges falling within the larger mass range in an iterative manner. Such a "scanning" or "sweeping" operation is done by, in effect, moving the (typically fixed-width) transmission window in the direction of increasing or decreasing ion mass. The transmission window is moved by varying the RF amplitude and DC magnitude of the composite RF/DC electric field in a proper manner.

The quadrupole transmission window may also be set to pass only a single ion mass (while rejecting all other ion masses) at a given time, which corresponds to a narrow mass range consisting of only the single ion mass. Isolating an ion of a single mass may be done, for example, when that ion has been selected to serve as a precursor ion for subsequent fragmentation into fragment ions. Fragmentation is performed in an ion fragmentation device (e.g., a collision cell) positioned between the mass filter and the final mass analyzer. One popular example is a quadrupole time-of-flight (Q-TOF) instrument, in which the collision cell is positioned between the quadrupole mass filter and the above-noted TOF analyzer. Such a technique is referred to as tandem mass spectrometry (MS-MS). In this case, the resulting mass spectrum is a spectrum of the fragment ions. The information acquired from the fragment ion spectrum can be correlated to the known precursor ion. The mass filter can be scanned through different precursor ions to sequentially acquire mass spectra of different, corresponding sets of fragment ions.

Besides the narrow band filter, the quadrupole mass filter can also serve as a scanning broad band (or wide band) mass filter, particularly in high-resolution tandem mass spectrometers such as the above-noted Q-TOF instrument. For example, in data independent acquisition (DIA), the quadrupole mass filter can be used as a broad band filter to in effect divide the entire mass range of interest into consecutive segments each having a width corresponding to the broad-band window width. The quadrupole mass filter is adjusted so as to iteratively move the window through the whole mass range, from one segment to the next segment, thereby enabling mass analysis of each segment sequentially instead of the entire mass range simultaneously. Compared to its total ion transmission mode, the scanning broad band mass filter mode of the quadrupole mass filter can improve trace analysis in complex samples by reducing the amount of fragment ions from interference species to be analyzed by TOF. Moreover, if the quadrupole band rejects high masses, the TOF operation can focus on low m/z (shorter flight time) with a higher number of transients to increase the signal of low m/z regions.

To ensure all these functionalities, the quadrupole transmitting window needs to be characterized accurately for calibration and tuning purposes. In this way, it can be ensured that the parameters of the quadrupole transmitting window (e.g., window width Δ m/z, and window edge locations defined by the low and high mass cutoffs) set by the user for use in sample analysis are in fact accurate.

The typical approach for characterizing a window is to scan (or sweep) a fixed size window to pass through a calibration ion, resulting in a mirrored profile of the window. The window width can be deduced from the Δ m/z value, at which the quadrupole mass filter is set, between the starting and end points of the window profile. Although such method is proven to be sufficient and accurate to characterize windows in narrow band filters, there are a few limitations when it is applied to broad band filters. First, quadrupole scan speed decreases as the window width increases. Second, dedicated effort is often used to prepare a calibrant solution that provides sufficient calibrant ions for a desired m/z range. Third, the edge locations of a window relative to the targeted m/z value of the quadrupole RF/DC setting are difficult to retrieve. Fourth, assessment of a complete window profile is impossible when the width of the window is numerically larger than the targeted m/z value of the quadrupole RF/DC setting.

From the foregoing, it would be useful to provide a system/apparatus/instrument and method for characterizing the quadrupole transmission window of a quadrupole mass filter.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

This disclosure provides an automated method and apparatus (or instrument, system, etc.) for characterizing the quadrupole transmitting window applied by a quadrupole mass filter of a mass spectrometer. The characterization utilizes the noise band of a transmitted chemical noise ion signal. The method disclosed herein may be referred to as a "noise band" method. The method may be particularly useful when implemented in a tandem mass spectrometer, even more particularly a high-resolution tandem mass spectrometer such as a Q-TOF instrument.

According to one embodiment, a method for characterizing a quadrupole transmitting window applied by a quadrupole mass filter of a mass spectrometer includes: producing ions from a sample, wherein some of the ions are chemical noise ions; producing an all-ions mass spectrum by transmitting the ions through the quadrupole mass filter while operating the quadrupole mass filter in a total ion transmission mode, and to a mass analyzer of the mass spectrometer; producing a mass filtered mass spectrum by transmitting the ions through the quadrupole mass filter while operating the quadrupole mass filter in a mass filter mode during which the quadrupole transmitting window is applied to the ions, such that the quadrupole mass filter transmits the chemical noise ions to the mass analyzer while rejecting the other ions in the quadrupole mass filter; analyzing the mass filtered mass spectrum and the all-ions mass spectrum to generate a window profile having a low-mass edge, a high-mass edge, and a window width between the low-mass edge and the high-mass edge characteristic of the applied quadrupole transmitting window; and determining m/z values for the low-mass edge, the high-mass edge, and the window width.

According to another embodiment, a mass spectrometry (MS) system includes: a quadrupole mass filter; a mass analyzer configured to receive ions from the quadrupole mass filter; an ion detector configured to receive ions from the mass analyzer; and a controller comprising an electronic processor and a memory, The controller is configured to control an operation that includes: producing ions from a sample, wherein some of the ions are chemical noise ions; producing an all-ions mass spectrum by transmitting the ions through the quadrupole mass filter while operating the quadrupole mass filter in a total ion transmission mode, and to the mass analyzer; producing a mass filtered mass spectrum by transmitting the ions through the quadrupole mass filter while operating the quadrupole mass filter in a mass filter mode during which the quadrupole transmitting window is applied to the ions, such that the quadrupole mass filter transmits the chemical noise ions to the mass analyzer while rejecting the other ions in the quadrupole mass filter; analyzing the mass filtered mass spectrum and the all-ions mass spectrum to generate a window profile having a low-mass edge, a high-mass edge, and a window width between the low-mass edge and the high-mass edge characteristic of the applied quadrupole transmitting window; and determining m/z values for the high-mass edge, the low-mass edge, and the window width.

According to another embodiment, a non-transitory computer-readable medium includes instructions stored thereon, that when executed on a processor, control or perform all or part of the steps of any of the methods disclosed herein.

According to another embodiment, a mass spectrometry (MS) system includes the computer-readable storage medium.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In this disclosure, the term "about" when modifying a specified numerical value is taken to encompass a range of values that include +/−10% of such numerical value.

In this disclosure, when relating to the window width, Δ m/z, of a quadrupole transmission window applied by a quadrupole mass filter, the term "narrow band" refers to a value of Δ m/z of 10 amu or less, for example widths in a range from 1 amu to 10 amu. The term "broad band" or "wide band" refers to a value of Δ m/z of greater than 10 amu, for example widths in a range from 50 amu to 1700 amu, or from 100 amu to 3200 amu.

Figure 1A:
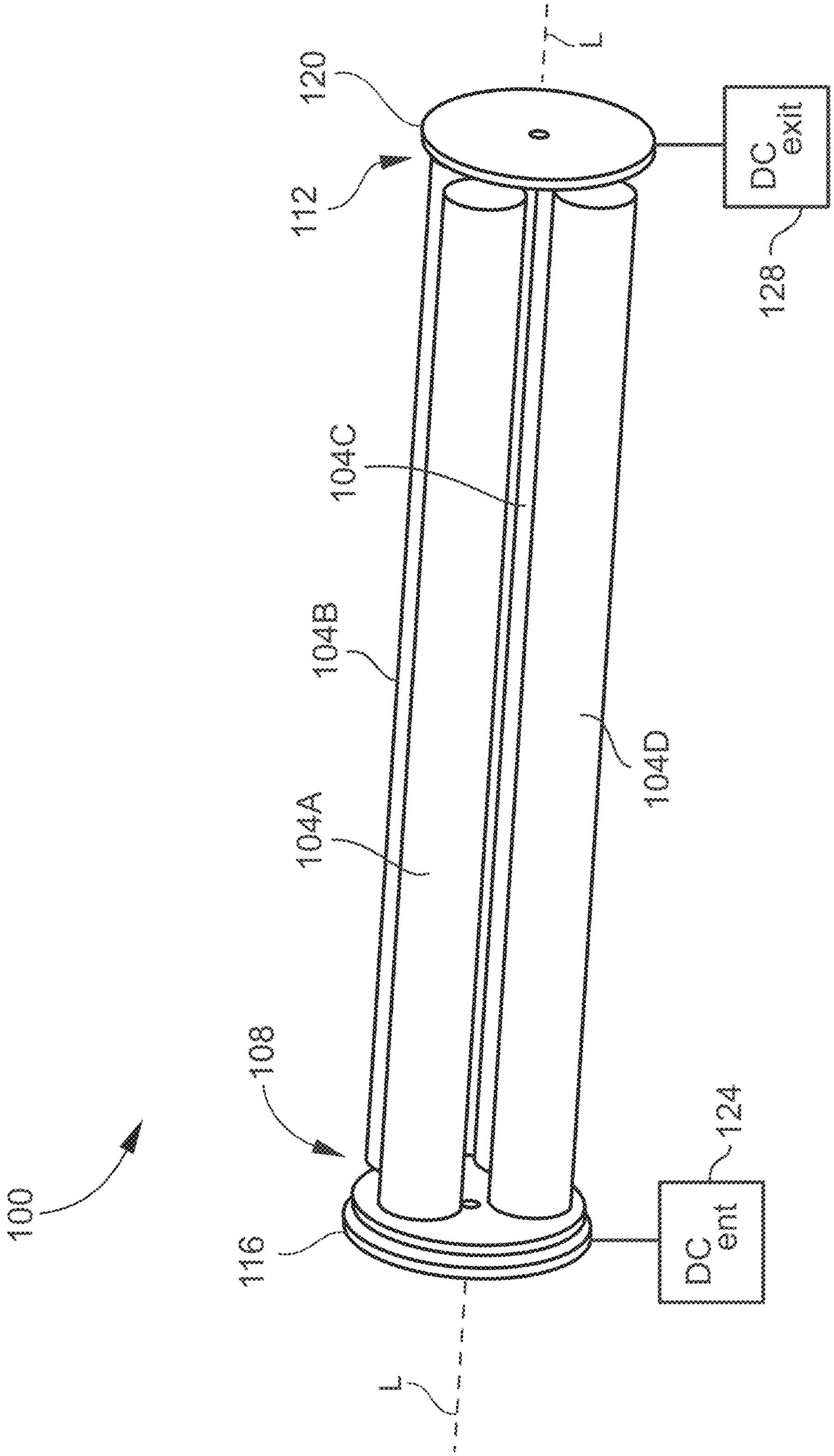
FIG. 1A is a schematic perspective view of an example of a quadrupole device according to an embodiment disclosed herein.
Figure 1B:
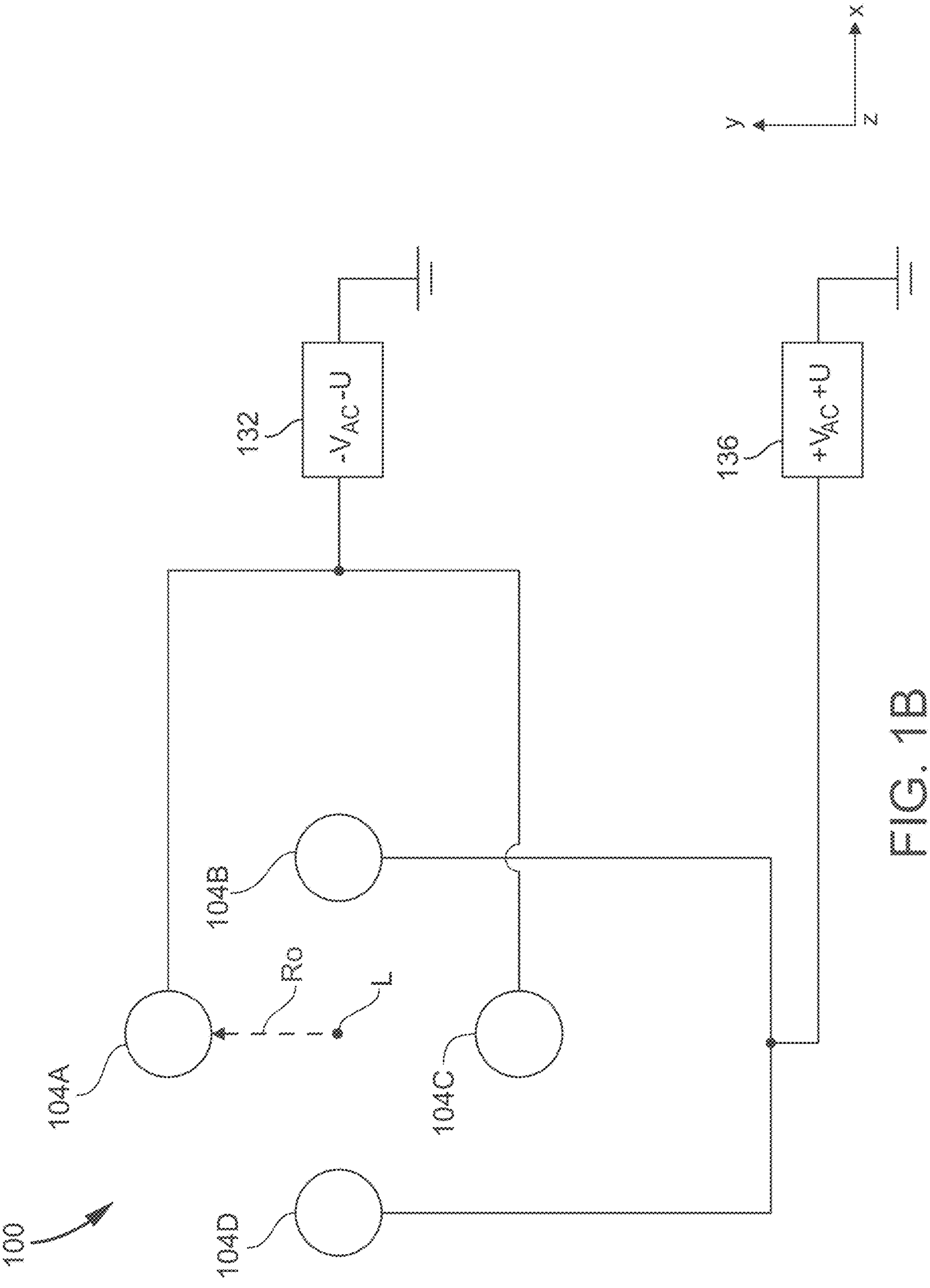
FIG. 1B is a schematic cross-sectional view of the quadrupole device illustrated in FIG. 1A, taken in a transverse plane orthogonal to the ion optical axis of the quadrupole device.

FIGS. 1A and 1B schematically illustrate an example of a quadrupole device 100 that may be configured to operate as a mass filter according to an embodiment of the present disclosure. Accordingly, the quadrupole device 100 may also be referred to herein as a quadrupole mass filter. It will be understood, however, that the quadrupole device 100 may be configured (or switched, adjusted, tuned, etc.) to operate as an RF-only ion guide that does not actively filter ions, i.e., does not apply a quadrupole transmission window. FIG. 1A is a schematic perspective view of the quadrupole device 100. FIG. 1B is a schematic cross-sectional view of the quadrupole device 100, taken in a transverse plane (x-y plane in FIG. 1B) orthogonal to the ion optical axis (z-axis in FIG. 1B) of the quadrupole device 100, at some axial point along the length of the quadrupole device 100. In a typical embodiment and as illustrated, the ion optical axis corresponds to the central, longitudinal axis of the quadrupole device 100, referred to herein as device axis L.

The quadrupole device 100 includes a set of four ion guide electrodes (or rod electrodes) 104A, 104B, 104C, and 104D arranged in a linear quadrupole configuration along the device axis L. In this configuration, the ion guide electrodes 104A, 104B, 104C, and 104D are elongated along the device axis L (typically in parallel with each other and with the device axis L), circumferentially spaced from each other about the device axis L (in the transverse or x-y plane), and positioned at a radial distance $R_o$ from the device axis L. In the present context, a radial distance runs in a direction in the transverse plane orthogonal to the device axis L, such as the x-axis or y-axis. Accordingly, the ion guide electrodes 104A, 104B, 104C, and 104D define an ion guide entrance 108, an ion guide exit 112 axially spaced from the ion guide entrance 108 by the axial length of the ion guide electrodes 104A, 104B, 104C, and 104D, and an axially elongated ion guide interior extending from the ion guide entrance 108 to the ion guide exit 112. Typically, each opposing pair (104A/104C, and 104B/104D) of the ion guide electrodes 104A, 104B, 104C, and 104D are electrically interconnected, as indicated in FIG. 1B.

FIG. 1A also shows an ion entrance lens 116 and an ion exit lens 120 respectively positioned at the ion guide entrance 108 and the ion guide exit 112. The ion entrance lens 116 and ion exit lens 120 generally represent any ion optics components that may be provided at the ion guide entrance 108 and the ion guide exit 112, respectively. In some embodiments, the ion entrance lens 116 and/or ion exit lens 120 may be considered as being part of the quadrupole device 100.

The quadrupole device 100 further includes, or at least is in communication with, an electrical power supply and associated electronics. In FIG. 1A, a portion of the power supply/electronics is schematically represented by an entrance DC potential source 124 communicating with the ion entrance lens 116 and an exit DC potential source 128 communicating with the ion exit lens 120. The entrance DC potential source 128 is configured to apply an entrance DC potential $DC_{ent}$ to the ion entrance lens 116. The exit DC potential source 128 is configured to apply an exit DC potential $DC_{exit}$ to the ion exit lens 120. Depending on the instrument in which the quadrupole device 100 is provided and/or the method being implemented, the ion entrance lens 116 and ion exit lens 120 may be utilized for forward acceleration of ions, and/or operated as ion gates and/or for other purposes. In the case of ion gates, the entrance DC potential source 124 and the exit DC potential source 128 may be configured to switch the entrance DC potential $DC_{ent}$ and the exit DC potential $DC_{exit}$, respectively, between a low magnitude and a high magnitude. For example, the low magnitude may correspond to an open (ON) state that passes ions, and the high magnitude may correspond to a closed (OFF) state that blocks ions (i.e., reflects ions as an electrostatic mirror). Intermediate magnitudes between the lowest and highest magnitudes are also possible, for example to generate a partial or semi-open DC potential barrier at the entrance end and/or exit end of the quadrupole device 100, as needed for a particular application.

FIG. 1B illustrates another portion of the power supply/electronics, schematically represented as a first combined, ion confining RF potential source/DC potential source (first RF/DC potential source) 132 and a second combined, ion confining RF potential source/DC potential source (second RF/DC potential source) 136. The first RF/DC potential source 132 communicates with one (first) opposing electrode pair 104A/104C, and the second RF/DC potential source 136 communicates with the other (second) opposing electrode pair 104B/104D. The RF/DC potential sources 132 and 136 are configured to apply an ion confining RF potential to the ion guide electrodes 104A, 104B, 104C, and 104D at a frequency $\Omega$ and amplitude $V_{RF}$ effective to generate a two-dimensional, time-varying RF electric field in the interior volume of the quadrupole device 100 surrounded (inscribed) by the ion guide electrodes 104A, 104B, 104C, and 104D. The RF potential applied by the first RF/DC potential source 132 to the first electrode pair 104A/104C is 180 degrees ($\pi$ radians) out of phase with the RF potential applied by the second RF/DC potential source 136 to the second electrode pair 104B/104D. For example, an RF potential of —$V_{RF}$ cos (at) is applied to the first electrode pair 104A/104C while an RF potential of $+V_{RF}$ cos (at) is applied to the second electrode pair 104B/104D, where the negative and positive signs of the RF potential indicate the 180-degree phase difference at any given instant of time. The resulting RF electric field radially confines the ions in the quadrupole device 100, i.e., limits the motions of the ions in the radial direction, thereby focusing the ions as an ion beam concentrated on the device axis L.

The RF/DC potential sources 132 and 136 are also configured to apply a quadrupole DC electric field to the ion guide electrodes 104A, 104B, 104C, and 104D. That is, the RF/DC potential sources 132 and 136 apply two DC electric fields with magnitudes of opposite polarities, ±U to the two opposing electrode pairs 104A/104C and 104B/104D, respectively. This quadrupole DC electric field is superimposed on the RF electric field (or, equivalently, the RF electric field is superimposed on the quadrupole DC electric field), resulting in a composite RF/DC electric field. Thus, as indicated in FIG. 1B, the electric potential applied to the first electrode pair 104A/104C may be expressed as $-V_{RF}-U$, and the electric potential applied to the second electrode pair 104B/104D may be expressed as $+V_{RF}+U$.

In addition to the above-noted RF and DC potentials, a DC offset potential (not schematically shown) may be applied to all four ion guide electrodes 104A, 104B, 104C, and 104D, as appreciated by persons skilled in the art. For example, the applied DC bias potential may have a constant, negative magnitude along the axial lengths of the guide electrodes 104A, 104B, 104C, and 104D.

The composite RF/DC electric field enables the quadrupole device 100 to operate as a mass filter that imposes a tunable mass range (or passband), corresponding to the quadrupole transmitting window described elsewhere herein, of which both the low-mass cutoff point and high-mass cutoff point are controllable (adjustable). According to known principles, by appropriately selecting the operating parameters of the composite RF/DC field, the quadrupole device 100 as a mass filter can be configured to impose a mass range having a window width that allows only a single ion mass, or a narrow range of ion masses (from a low-mass cut-off point to a high-mass cut-off point), or a broad range of ion masses, to pass through the interior volume of the quadrupole device 100. Typically, the controlled/adjusted operating parameters are the RF amplitude $V_{RF}$ and DC magnitude U, with the RF frequency $\Omega$ held constant. Ions having masses within the mass bandpass have stable trajectories, and thus are able to traverse the entire length of the quadrupole device 100 and reach the ion exit 112. On the other hand, ions having masses outside the mass bandpass have unstable trajectories, and thus will be rejected and removed from the interior volume (e.g., by colliding with or possibly passing between the ion guide electrodes 104A, 104B, 104C, and 104D). That is, the kinetic energy of such unstable ions will overcome the RF confining field and be removed from the quadrupole device 100 (e.g., in a radial/transverse direction) without the possibility of exiting the quadrupole device 100 via the ion exit 112. In addition to tuning or setting the window width, the quadrupole transmitting window can be moved through a larger mass range by scanning (adjusting or varying) the appropriate operating parameters, enabling the selection of a specific ion mass or masses to be transmitted out from the quadrupole device 100 at any given time, or the selection of multiple ion masses or ion mass ranges sequentially.

In more formal terms, as appreciated by persons skilled in the art, the stability of ions in the quadrupole device 100 are described by the Mathieu operating parameters a and q, which are expressed as:

$$a = \frac{8zU}{mR_0^2\Omega^2} \text{ and} \tag{1}$$

$$q = \frac{4zV_{RF}}{mR_0^2\Omega^2}, \tag{2}$$

where, again, U is the magnitude of the applied quadrupole DC potential, $V_{RF}$ is the amplitude of the applied quadrupole RF potential, $R_0$ is the field radius from the device axis L of the interior volume inscribed by the ion guide electrodes 104A, 104B, 104C, and 104D, $\Omega$ is the main drive frequency of applied quadrupole RF potential, and m/z is the mass-to-charge ratio of an ion under consideration.

At any instant of time, the stability of an ion of a given mass (or, more precisely, m/z ratio) in the interior volume of the quadrupole device 100 depends on the variables of the Mathieu operating parameters a and q. With the field radius $R_0$ fixed by geometry and the main drive angular frequency $\Omega$ also typically fixed (held constant) during operation, the stability of an ion is dictated solely by the values set for the DC potential U and RF potential $V_{RF}$, which are tunable. Thus, the DC potential U and RF potential $V_{RF}$ may be set to define the mass range of ions transmitted by the quadrupole device 100, or additionally may be varied to implement a mass scanning mode by which ions of successively higher or lower masses become stable or unstable.

In addition to the mass filtering mode, the quadrupole device 100 may operate in, and may be switched to, an all-ion or total ion transmission mode in which (substantially) all ions entering the quadrupole device 100 via the ion entrance 108 are able to traverse the entire axial length of the ion guide interior and exit the quadrupole device 100 via the ion exit 112. In this case, a quadrupole transmitting window is not applied. Instead, the quadrupole device 100 serves primarily as a linear ion guide, with the RF electric field functioning only to focus the ions along the device axis L. This is known as an RF-only mode, as the DC quadrupole field is not applied (U=0). In terms of the above-noted Mathieu operating parameters, the condition U=0 corresponds to a=0 (see Eq. (1) above), and therefore only the operating parameter q is relevant to ion stability in the RF-only mode.

Figure 2A:
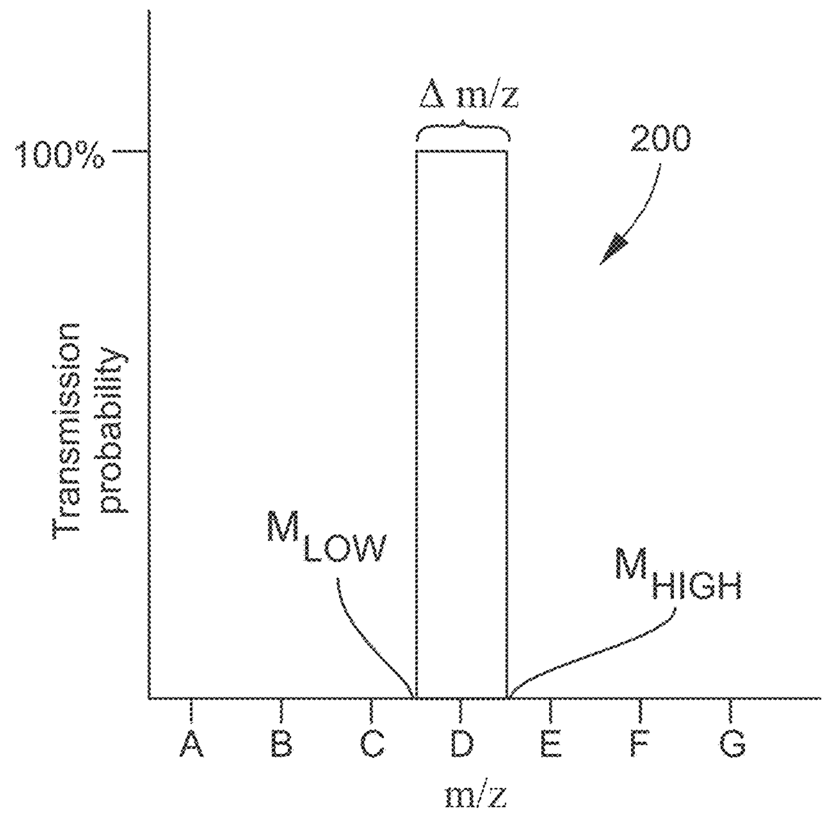
FIG. 2A is an illustration of an example of a narrow quadrupole transmitting window, represented as an idealized plot of transmission probability as a function of m/z ratio.

FIG. 2A is an illustration of an example of a narrow quadrupole transmitting window 200, represented as an idealized plot of transmission probability (ordinate), i.e. the probability that an ion of a given mass will successfully pass through the quadrupole device 100, as a function of m/z ratio (abscissa). The quadrupole transmitting window is characterized by a window width Δ m/z that starts at a low-mass edge $M_{LOW}$ (left edge in FIG. 2A) corresponding to the selected low-mass cutoff point and ends at a high-mass edge $M_{HIGH}$ (right edge in FIG. 2A) corresponding to the selected high-mass cutoff point. While the quadrupole transmitting window 200 is being applied (during operation of the quadrupole device 100 and its associated instrument/system), all ions inside the quadrupole transmitting window 200—such as m/z=D and any other ions having masses in the range from $M_{LOW}$ to $M_{HIGH}$—will pass through the quadrupole device 100. At the same time, all other ions (all ions outside the quadrupole transmitting window 200, i.e, having masses less than $M_{LOW}$ or greater than $M_{HIGH}$—such as lower mass ions m/z=A, m/z=B and m/z=C and higher mass ions m/z=E, m/z=F and m/z=G—will be rejected by the quadrupole device 100 and thus prevented from passing through the quadrupole device 100. Noted again is an example where the quadrupole device 100 is set for unit resolution, in which case only a single target ion (e.g., m/z=D) will be allowed to pass. The narrow quadrupole transmitting window 200 may be utilized, for example, to target a single ion mass (or a narrow mass range that includes the target mass) for measurement (or also for pre-measurement fragmentation), or to sequentially select different ion masses during a mass scanning mode as described elsewhere herein.

Figure 2B:
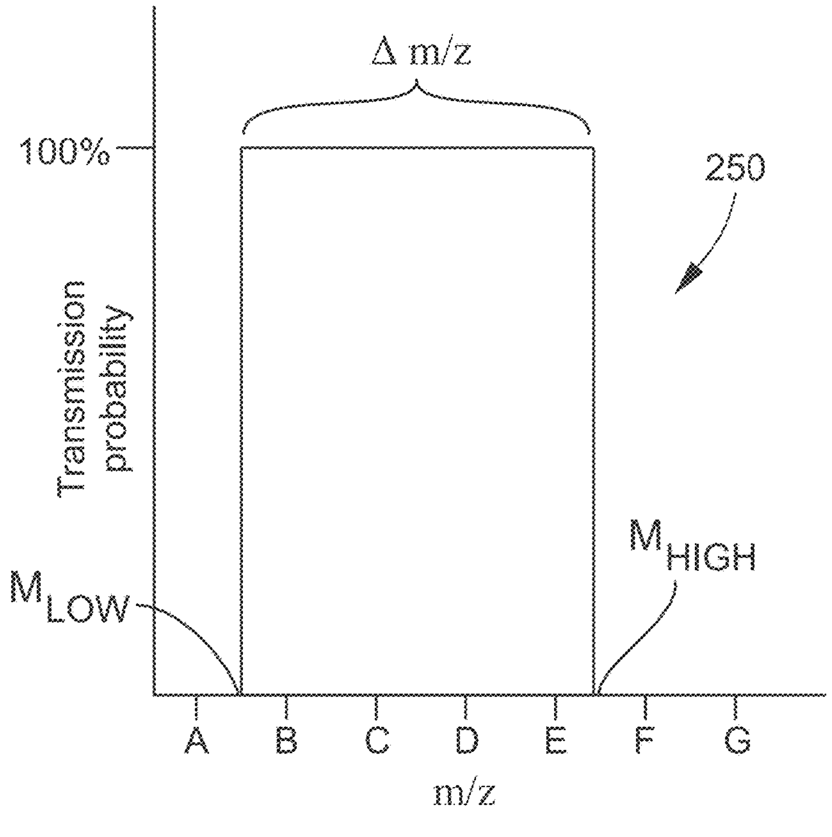
FIG. 2B is an illustration of an example of a broad quadrupole transmitting window, represented as an idealized plot of transmission probability as a function of m/z ratio.
Figures 3A, 3B, 3C, 3D:
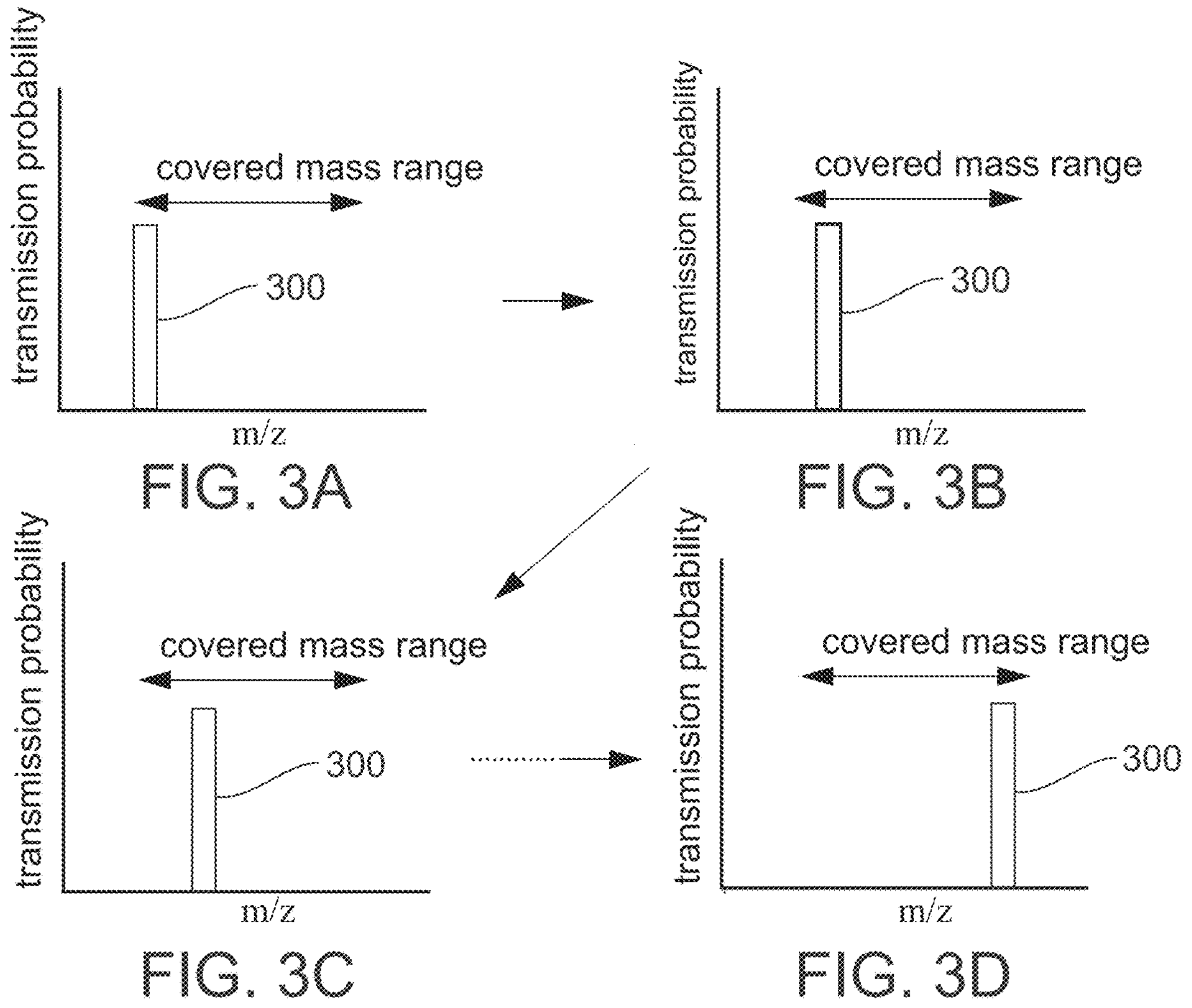
FIGS. 3A-3D are sequential illustrations of an example of scanning a quadrupole transmitting window in a step-wise manner through a desired ion mass range of interest.

By comparison, FIG. 2B is an illustration of an example of a broad quadrupole transmitting window 250, again represented as an idealized plot of transmission probability as a function of m/z ratio. In this case, the quadrupole device 100 passes a comparatively broad range of ions—such as m/z=B, m/z=C, m/z=D and m/z=E—while rejecting ions having masses less than the low-mass cutoff value (e.g., m/z=A) and greater than the high-mass cutoff value (e.g., m/z=F, m/z=G and higher). The broad quadrupole transmitting window 250 utilized, for example, to isolate a broad range of ions for analysis. In FIG. 2B, for example, a broad range of low-mass ions (having masses inside the quadrupole transmitting window 250) are selected for transmission out from the quadrupole device 100 while higher-mass ions are rejected, which may be desired for enhancing the measurement signal acquired from the selected low-mass ions.

FIGS. 3A-3D are illustrations of an example of scanning a (typically narrow) quadrupole transmitting window 300 (typically by scanning the ratio $U/V_{RF}$) so as to shift the quadrupole transmitting window 300 in a step-wise manner, and thereby sequentially transmit a desired full mass range of interest. Similar to FIGS. 2A and 2B, FIGS. 3A-3D depict the quadrupole transmitting window 300 as a plot of transmission probability as a function of m/z ratio, but at different iterations of the scanning process as the quadrupole transmitting window 300 is moved through the entire mass range being scanned. In each of FIGS. 3A-3D, the horizontal, double-headed arrow spans the extent of the total mass range of ions that may be sequentially transmitted by the quadrupole device 100 in this example (the "covered mass range"). In this example, the voltage parameters U and $V_{RF}$ are adjusted so as to successively shift the quadrupole transmitting window 300 from lower masses (or mass ranges) to higher masses (or mass ranges).

Figure 4:
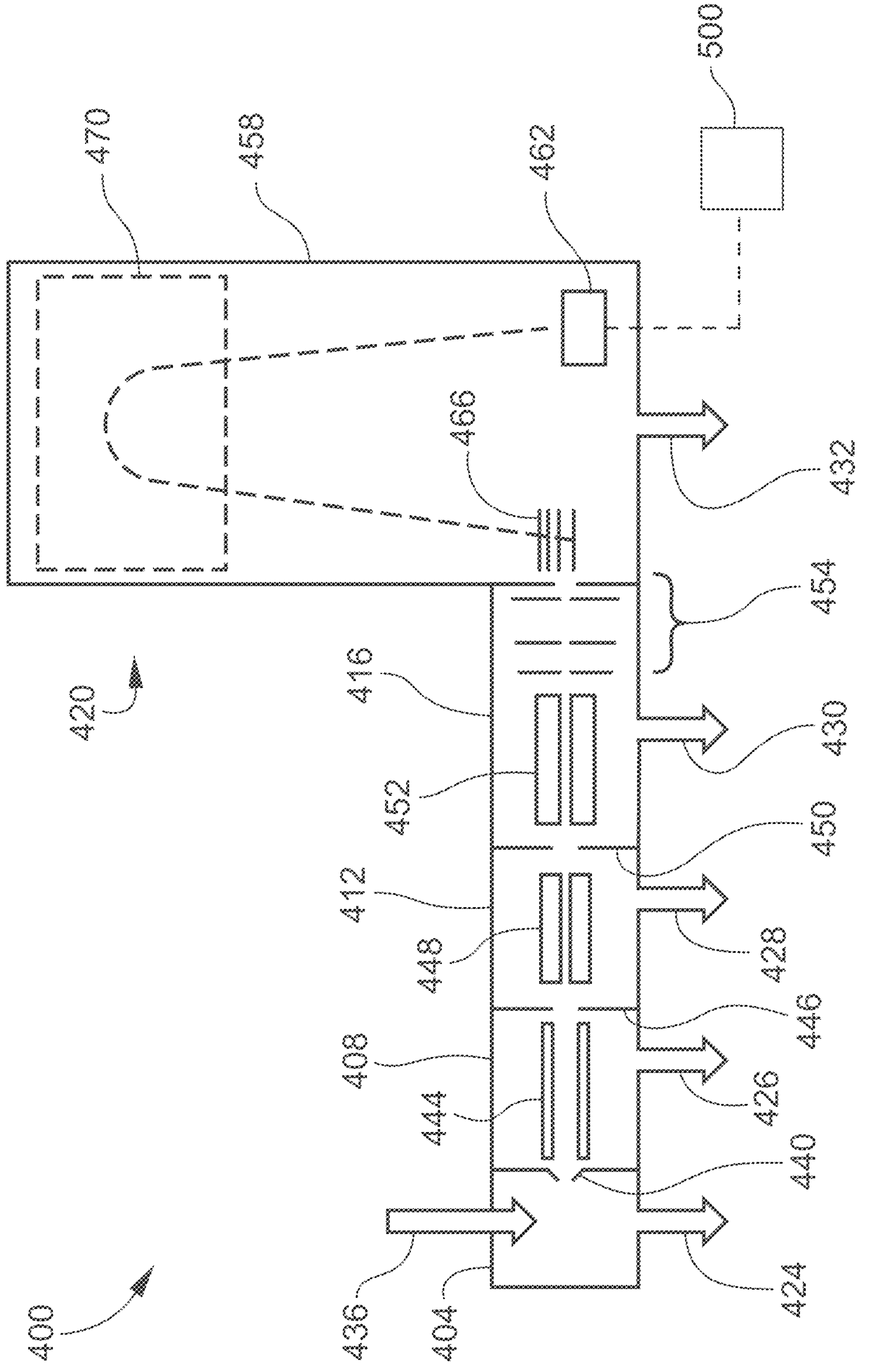
FIG. 4 is a schematic view of an example of a mass spectrometry (MS) system according to the present disclosure.

FIG. 4 is a schematic view of an example of a mass spectrometry (MS) system 400 in which the presently disclosed subject matter may be implemented. The operation and design of various components of MS systems are generally known to persons skilled in the art and thus need not be described in detail herein. Instead, certain components are briefly described to facilitate an understanding of the subject matter presently disclosed.

The MS system 400 may generally include an ion source 404, one or more ion transfer devices 408, 412, and 416 (or ion processing devices), and a (final, or second stage) mass analyzer 420. Three ion transfer devices 408, 412, and 416 are illustrated by example only, as other embodiments may include less than three or more than three. In the illustrated example, the MS system 400 is a Q-TOF instrument, where at least one of the ion transfer devices 408, 412, and 416 is configured as a quadrupole mass filter as described herein, and the final mass analyzer 420 is configured as a time-of-flight (TOF) analyzer. However, the presently disclosed subject matter encompasses other types of MS systems in which a different type of mass analyzer 420 is provided.

The MS system 400 includes a plurality of chambers defined by one or more housings (enclosures), and arranged in series such that each chamber communicates with at least one adjacent (upstream or downstream) chamber. Each of the ion source 404, ion transfer devices 408, 412, and 416, and mass analyzer 420 includes at least one of these chambers. Thus, the MS system 400 defines a flow path for ions and gas molecules generally from the chamber of the ion source 404, through the chambers of the ion transfer devices 408, 412, and 416, and into the chamber(s) of the mass analyzer 420. From the perspective of FIG. 4, the flow path is generally directed from the left to the right. Each chamber is physically separated from an adjacent chamber by at least one structural boundary, e.g., a wall. The wall includes at least one opening to accommodate the flow path. The wall opening may be quite small relative to the overall dimensions of the chambers, thus serving as a gas conductance barrier that limits transfer of gas from a preceding chamber to a succeeding chamber and facilitates independent control of respective vacuum levels in adjacent chambers. The wall may serve as an electrode or ion optics component. Alternatively or additionally, electrodes and/or ion optics components may be mounted to or positioned proximate to the wall. Any of the chambers may include one or more ion guides, such as a linear multipole ion guide (e.g., quadrupole, hexapole, octopole, etc.), an ion funnel, a stack of ring electrodes, etc. One or more of the chambers may include a quadrupole device configured as a mass filter as described herein.

At least some of the chambers may be considered to be pressure-reducing chambers, or vacuum stages, that operate at controlled, sub-atmospheric internal gas pressures. For this purpose, the MS system 400 includes a vacuum system communicating with vacuum ports of such chambers. In the illustrated embodiment, each of the ion source 404, ion transfer devices 408, 412, and 416, and mass analyzer 420 includes at least one chamber having a respective vacuum port 424, 426, 428, 430, and 432 that communicates with a vacuum system. Generally, when the MS system 400 is operated to analyze a sample, each chamber successively reduces the gas pressure below the level of the preceding chamber, ultimately down to the very low vacuum-level required for operating the mass analyzer 420 (e.g., ranging from $10^{-4}$ to $10^{-9}$ Torr). However, one of the ion transfer devices 408, 412, and 416 may be a collision cell, in which case the pressure in the associated chamber may be higher than the preceding chamber. In FIG. 4, the vacuum ports 424, 426, 428, 430, and 432 are schematically represented by wide arrows. The vacuum system as a whole is schematically represented by these wide arrows, with the understanding that the vacuum system includes vacuum lines leading from the vacuum ports 424, 426, 428, 430, and 432 to one or more vacuum-generating pumps and associated plumbing and other components as appreciated by persons skilled in the art. In operation, one or more of the vacuum ports 424, 426, 428, 430, and 432 may remove non-analyte neutral molecules from the ion path through the MS system 400.

The ion source 404 may be any type of continuous-beam or pulsed ion source suitable for producing analyte ions for mass spectral analysis. Depending on the embodiment, the ion source 404 may operate at or near atmospheric pressure (an atmospheric pressure ionization, or API, source) or at a vacuum pressure. In the case of an API source, the vacuum port 424 serves as an exhaust port through which gases, contaminants, etc. may be removed from the chamber. The chamber of the ion source 404 is an ionization chamber in which sample molecules are broken down to analyte ions by an appropriate ionization device (not shown). The sample to be ionized may be introduced to the ion source 404 by any suitable means, including hyphenated techniques in which the sample is an output 436 of a pre-ionization analytical or preparative separation instrument such as, for example, a gas chromatography (GC), liquid chromatography (LC), or electrophoresis (e.g., capillary electrophoresis, CE) instrument (not shown). The ion source 404 may include a skimmer 440 (or two or more skimmers axially spaced from each other), also referred to as a skimmer plate, skimmer cone, or sampling cone. The skimmer 440 has a central aperture. The skimmer 440 is configured for preferentially allowing ions to pass through to the next chamber while blocking non-analyte components. The ion source 404 may also include other components (electrodes, ion optics, etc., not shown) useful for organizing as-produced ions into a beam that may be efficiently transferred into the next chamber.

In some embodiments, the first ion transfer device 408 may be configured primarily as a pressure-reducing stage. For this purpose, the ion transfer device 408 may include ion transfer optics 444 configured for keeping the ion beam focused along a main optical axis of the MS system 400. The ion transfer optics 444 may have various configurations known to persons skilled in the art, such as, for example, a multipole arrangement of electrodes elongated along the axis (e.g., a multipole ion guide), a serial arrangement of ring electrodes, an ion funnel, a split cylinder electrode, etc. In some embodiments, the ion transfer optics 444 may be configured as an ion trap. One or more lenses 446 may be positioned between the ion transfer device 408 and the succeeding ion transfer device 412.

In an embodiment, the second ion transfer device 412 may be configured as a mass filter, and thus may correspond to the quadrupole device 100 described above in conjunction with FIGS. 1A-3D. For this purpose, the ion transfer device 408 may include ion transfer optics 448 in the form of a quadrupole arrangement of electrodes as described above. One or more lenses 450 may be positioned between the ion transfer device 412 and the succeeding ion transfer device 416.

In some embodiments, the third ion transfer device 416 may be configured as a cooling cell or collision cell. For this purpose, the ion transfer device 416 may include ion transfer optics 452 such as a multipole arrangement of electrodes, typically configured as a non-mass-resolving, RF-only device. If configured as a cooling cell, a cooling gas (or damping gas) such as, for example, argon, nitrogen, helium, etc., may be flowed into the chamber of the ion transfer device 416 to cool down (or "thermalize," i.e., reduce the kinetic energy of) the ions by way of collisions between the ions and the gas molecules. If configured as a collision cell, the gas added to the chamber ("collision gas") results in a gas pressure sufficient (in combination with sufficient ion kinetic energy) to enable fragmentation of ions by collision induced dissociation (CID). Another type of ion fragmentation device may be provided instead of a collision cell, such as an electron capture dissociation (ECD) cell. Ion beam shaping optics 454 may be positioned between the ion transfer device 416 and the mass analyzer 420. In other embodiments, the ion transfer device 416 may be configured primarily as a pressure-reducing stage.

The final mass analyzer 420 may be any type of mass analyzer, and includes or is followed by an appropriate ion detector 462. In the illustrated embodiment, by example only, the mass analyzer 420 is depicted as a TOF analyzer as noted above. In this case, the mass analyzer 420 includes an evacuated, electric field-free flight tube 458 into which ions are injected by an ion pulser 466 (or ion pusher, ion puller, ion extractor, etc.). As appreciated by persons skilled in the art, the beam shaping optics 454 direct the ion beam into the ion pulser 466, which pulses the ions into the flight tube 458 as ion packets. The ions drift through the flight tube 458 toward the ion detector 462. Ions of different masses travel through the flight tube 458 at different velocities and thus have different overall times-of-flight, i.e., ions of smaller masses travel faster than ions of larger masses. Each ion packet spreads out (is dispersed) in space in accordance with the time-of-flight distribution. The ion detector 462 detects and records the time that each ion arrives at (impacts) the ion detector 462. A data acquisition device then correlates the recorded times-of-flight with m/z ratios. In some embodiments, as illustrated, the ion pulser 466 accelerates the ion packets into the flight tube 458 in a direction orthogonal to the direction along which the beam shaping optics 454 transmit the ions into the ion pulser 466, which is known as orthogonal acceleration TOF (oa-TOF). In this case, the flight tube 458 often includes an ion mirror (or reflectron) 470 to provide an approximately 180° reflection or turn in the ion flight path for extending the flight path and correcting the kinetic energy distribution of the ions.

The MS system 400 may also include a system controller 500 (or controller, or computing device) in signal communication (either wired or wirelessly) with one or more of the above-described components of the MS system 400 for various purposes, as partially represented by a dashed line between the system controller 500 and the ion detector 462 in FIG. 4. Generally, the system controller 500 is configured to control, monitor, and coordinate (e.g., timewise) the operations of various components of the MS system 400 as needed for successful operation. For example, the system controller 500 may be configured to control the ion source 404, ion transfer devices 408, 412 and 416, mass analyzer 420, and vacuum system, including the voltage potentials applied to various electrodes and other ion optics components, gas flow rates, chamber pressures, etc., as appreciated by persons skilled in the art. The system controller 500 may also be configured to receive and process the ion measurement signals produced by and outputted from the ion detector 462 during operation, as needed to produce user-interpretable data relating to the sample (or calibrant solution) under analysis. In an embodiment, the system controller 500 may also represent a window characterizing module configured to characterize the quadrupole transmitting window set for the quadrupole mass filter, as described further below. For all such purposes, the system controller 500 may include any suitable combination of hardware, firmware, software, etc., including one or more electronics-based processors and memories, as appreciated by persons skilled in the art. For example, the system controller 500 may include a non-transitory computer-readable medium that includes non-transitory instructions for performing any of the methods disclosed herein.

In operation, a sample is introduced to the ion source 404. The ion source 404 produces sample ions (analyte ions and background ions) from the sample and transfers the ions to the first ion transfer device 408, which may serve primarily as a first pressure-reducing stage. The first ion transfer device 408 transfers the ions to the second ion transfer device 412. As described above, the ion transfer optics 448 of the second ion transfer device 412 include a quadrupole device that can be switched between a total ion transmission (RF-only) mode and a mass filtering mode. In the total ion transmission mode, all ions entering the second ion transfer device 412 (or, at least those ions whose trajectories remain stable while traveling through the second ion transfer device 412) are transferred to the third ion transfer device 416. In the mass filtering mode, ions of one or more selected masses are isolated from the other ions that entered the second ion transfer device 412, and only those selected ions are transferred to the third ion transfer device 416 at a given point in time, as described above.

In either case (total ion transmission mode or mass filtering mode), the third ion transfer device 416 then transfers the ions outputted from the second ion transfer device 412 to the mass analyzer 420. Depending on the embodiment and as described above, the third ion transfer device 416 may perform additional ion processing operations such as ion fragmentation, beam shaping, etc., or even additional mass filtering. The mass analyzer 420 mass-resolves the ions, and ions of different masses arrive at the ion detector 462 at different points of time, as described above. The measurement signals outputted from the ion detector 462 are processed by the system controller 500 to produce mass spectra.

Figure 5:
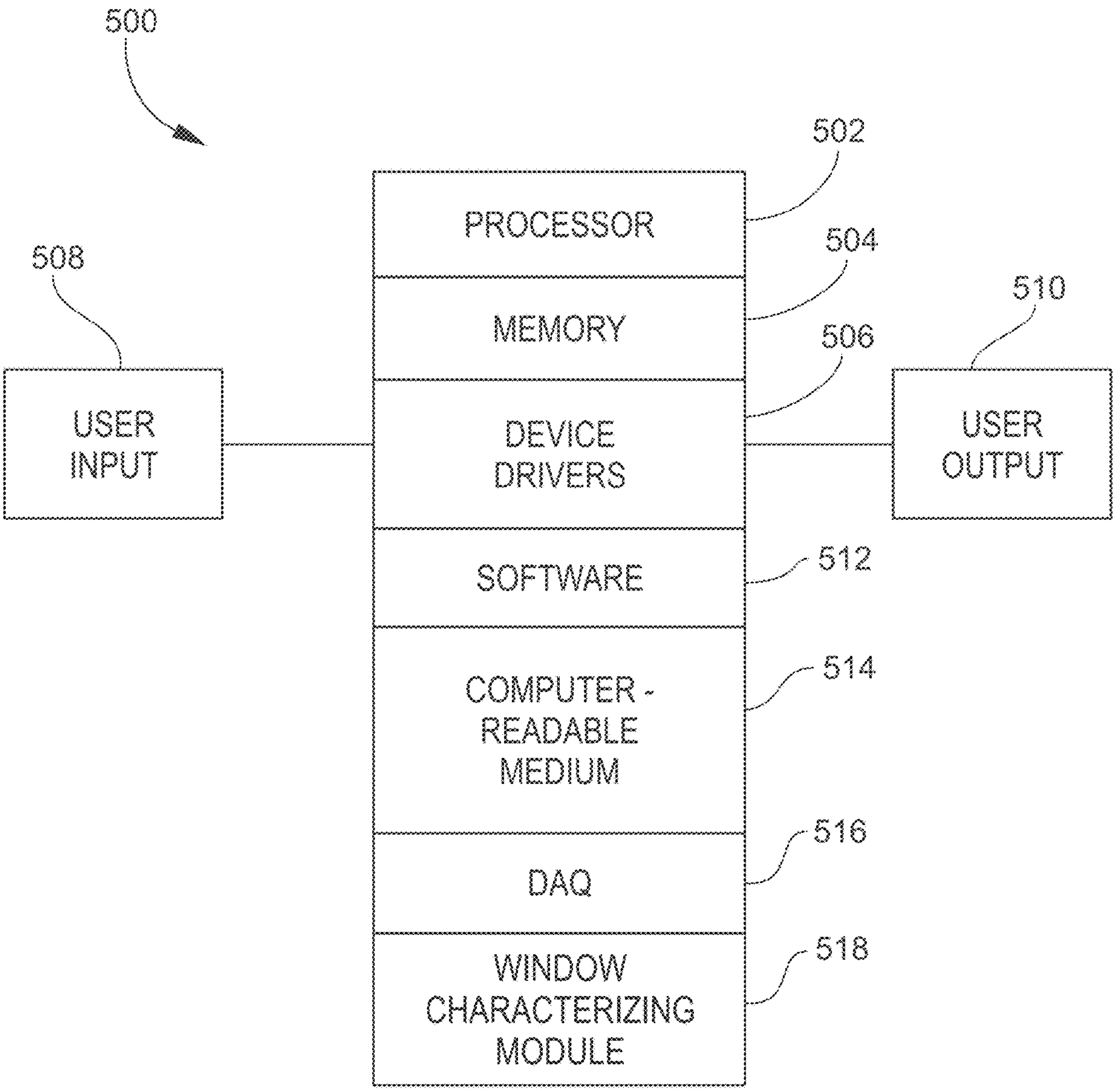
FIG. 5 is a schematic view of a non-limiting example of a system controller that may be part of or communicate with a spectrometry system such as the MS system illustrated in FIG. 4.

FIG. 5 is a schematic view of a non-limiting example of the system controller 500 that may be part of or communicate with a spectrometry system such as the MS system 400 illustrated in FIG. 4. The system controller 500 may schematically represent one or more modules, control units, components, or the like configured for controlling, monitoring, analyzing and/or timing the operation of various devices that may be provided in the MS system 400, as well as controlling or executing one or more steps of any of the methods disclosed herein. In addition to those shown in FIG. 4, such devices may include, for example, voltage sources, timing controllers, clocks, frequency/waveform generators, processors, logic circuits, memories, databases, etc. One or more modules of the system controller 500 may be, or be embodied in, for example, a computer workstation, desktop computer, laptop computer, portable computer, tablet computer, handheld computer, mobile computing device, personal digital assistant (PDA), smartphone, etc. One or more modules of the system controller 500 may communicate with one or more other modules via one or more busses or other types of communication lines, as appreciated by persons skilled in the art.

In the illustrated embodiment, the system controller 500 includes an electronics-based processor 502, which may be representative of a main electronic processor providing overall control, and one or more electronic processors configured for dedicated control operations or specific signal processing tasks (e.g., a graphics processing unit or GPU, a digital signal processor or DSP, an application-specific integrated circuit or ASIC, a field-programmable gate array or FPGA, etc.). The system controller 500 also includes one or more memories 504 (volatile and/or non-volatile, e.g. RAM and/or ROM) for storing data and/or software. Stored data may be organized in one or more databases or look-up tables. The system controller 500 may also include one or more device drivers 506 for controlling one or more types of user interface devices and providing an interface between the user interface devices and components of the system controller 500 communicating with the user interface devices. Such user interface devices may include user input devices 508 (e.g., keyboard, keypad, touch screen, mouse, joystick, trackball, and the like) and user output devices 510 (e.g., display screen, printer, visual indicators or alerts, audible indicators or alerts, and the like). In various embodiments, the system controller 500 may be considered as including one or more of the user input devices 508 and/or user output devices 510, or at least as communicating with them. The system controller 500 may also include one or more types of computer programs or software 512 contained in memory and/or on one or more types of computer-readable media 514. The computer programs or software may contain non-transitory instructions (e.g., logic instructions) for controlling or performing various operations of the MS system 400. The computer programs or software may include application software and system software. System software may include an operating system (e.g., a Microsoft Windows® operating system) for controlling and managing various functions of the system controller 500, including interaction between hardware and application software. In particular, the operating system may provide a graphical user interface (GUI) displayable via a user output device 510, and with which a user may interact with the use of a user input device 508. The system controller 500 may also include one or more data acquisition/signal conditioning components (DAQs) 516 (as may be embodied in hardware, firmware and/or software) for receiving and processing ion measurement signals outputted by the ion detector 462, including formatting data for presentation in graphical form by the GUI (e.g., chromatograms, mass spectra, etc.).

The system controller 500 further includes a window characterizing module 518 (as may be embodied in hardware, firmware and/or software) configured to carry out all or part of (and one or more steps of) any of the methods described herein.

Non-exclusive examples of a noise band method for characterizing the quadrupole transmitting window applied by a quadrupole mass filter (as may be implemented in whole or in part by the above-noted window characterizing module 518) according to the present disclosure will now be described.

Generally, any sample (including a calibrant or tune mix solution) introduced to an MS system for processing contains trace impurities that, when ionized, are manifested as chemical noise ions in a widely distributed m/z range. Moreover, cluster ions may be formed, which may be multiply charged. These chemical noise ions, when filtered by the quadrupole mass filter, can form a distinguishing noise band signal on a spectrum measured by the final mass analyzer to reflect the corresponding quadrupole transmitting window. Advantageously, the final mass analyzer utilized to measure the noise band should be capable of recording complete mass spectra at a high duty cycle, such as a TOF analyzer as described above. Moreover, the final mass analyzer should be tuned in an abundance-oriented mode. In the case of a Q-TOF instrument, the parameters of the transfer optics and the TOF ion pulser are often adjusted to meet this purpose.

In an embodiment, the method entails producing both an all-ions mass spectrum from the ionized sample and a mass filtered spectrum from the chemical noise ions of the sample. In the present context, an “all-ions” mass spectrum is the spectrum collected with the quadrupole mass filter operated in total ion transmission mode (RF-only). For this purpose, the operation of the quadrupole mass filter may be alternated (preferably at a fast speed) between the total ion transmission mode and the mass filter mode (RF/DC) described above. The spectral profiles (continuous signal) of both modes, either single spectrum or averaged from multiple spectra, are obtained with the final mass analyzer.

The method then entails analyzing the mass filtered mass spectrum and the all-ions mass spectrum as needed to generate a window profile having a low-mass edge, a high-mass edge, and a window width between the low-mass edge and the high-mass edge characteristic of the applied quadrupole transmitting window. The m/z values for the low-mass edge, the high-mass edge, and the window width (e.g., $M_{LOW}$, $M_{HIGH}$, and Δm/z shown in FIG. 2A or 2B) are then determined. These m/z values may be utilized to calibrate the quadrupole mass filter, for example in preparation for a subsequent mass analysis of a sample of interest.

Figure 6A:
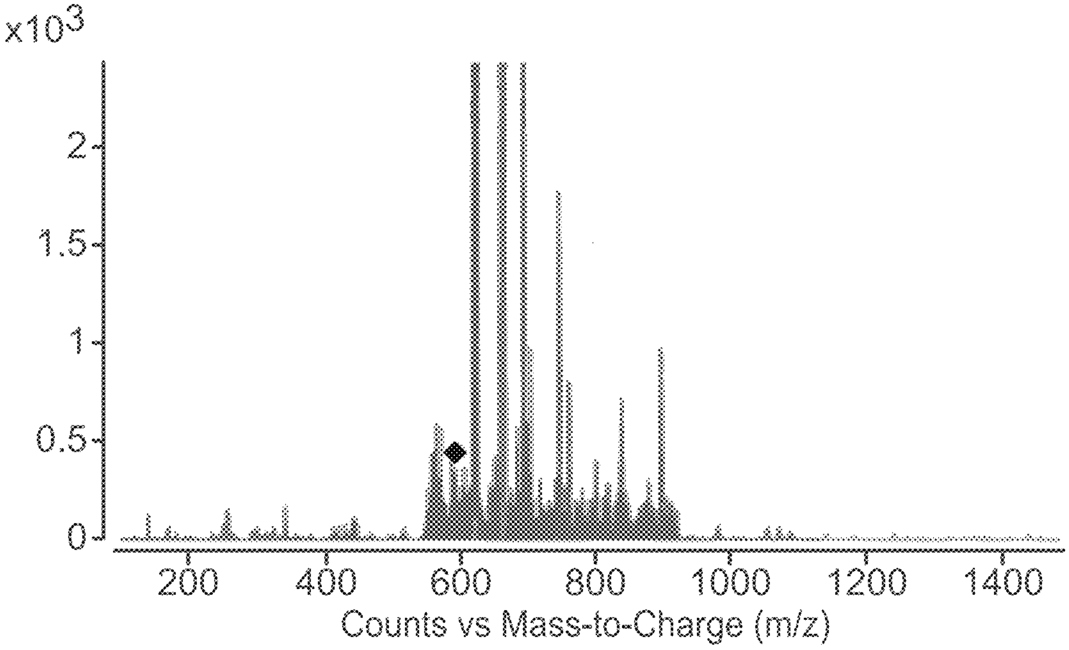
FIG. 6A is an example of a chemical noise spectrum acquired from a calibrant solution processed in a Q-TOF instrument consistent with the MS system described above and illustrated in FIG. 4.
Figure 6B:
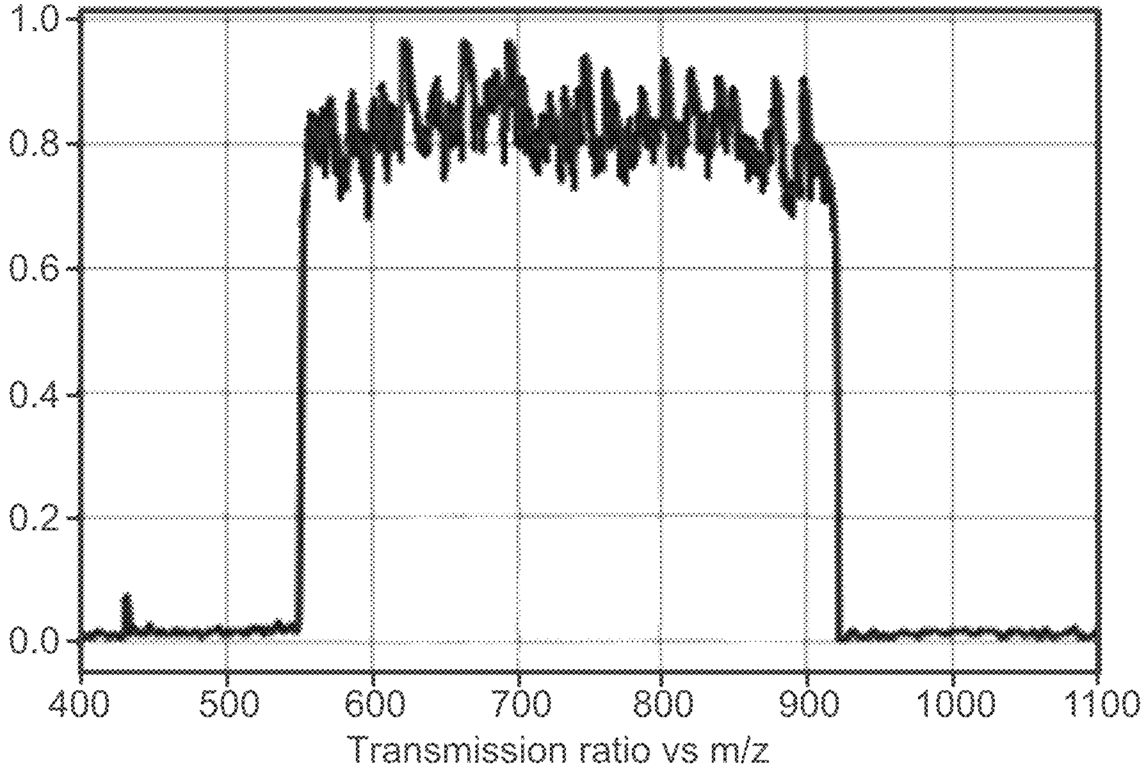
FIG. 6B is an example of a window profile generated from the chemical noise spectrum shown in FIG. 6B by utilizing a noise band method as disclosed herein.

Generally, any analysis (e.g., utilizing an algorithm or mathematical method) may be utilized that is effective for converting the chemical noise ion spectrum into a window profile accurately corresponding to the quadrupole transmitting window at which the quadrupole mass filter has been set. As one example of such conversion, FIG. 6A is an example of a zoomed in mass spectrum illustrating the chemical noise spectrum acquired from a calibrant solution processed in a Q-TOF instrument consistent with the MS system 400 described above and illustrated in FIG. 4. FIG. 6B is an example of a window profile gene rated from the chemical noise spectrum shown in FIG. 6A by utilizing the noise band method disclosed herein. The method clearly delineates the left and right edges of the window.

As one non-exclusive example, the analysis may include a normalization of the mass filtered mass spectrum by the all-ions mass spectrum. The mathematical description of this normalization approach is as follows.

Let Q[n] be the mass filtered mass spectrum, and T[n] be the all-ions mass (total transmitted ions, or TTI) spectrum, each of which may be an averaged spectrum obtained from multiple acquired spectra as noted above.

Let $$B[n] = \begin{cases} \frac{1}{w} & \text{if } -\frac{w}{2} < n \le \frac{w}{2} \\ 0 & \text{otherwise} \end{cases}$$

be a boxcar moving average filter with width w.

Let * be the convolution operator in the following convolution formula:

$$(f*g)[n]=\Sigma_{k=-\infty}^{\infty} f[k]g[n-k].$$

Then, the boxcar moving average filter (or, alternatively, another type of moving average filter) can be applied to Q[n] and T[n], and also to the quotient of the two spectra Q[n] and T[n] after mathematically filtering each. Note that applying two boxcars is equivalent to a triangle filter, and applying an infinite series of boxcars converges to a Gaussian window filter.

In the present example, the mathematical filter B[n] is applied to generate a window profile, P[n], for the quadrupole transmitting window as follows:

$$P[n] = \left(\frac{Q[n]*B[n]*B[n]}{T[n]*B[n]*B[n]}\right)*B[n],$$

where w=750.

This is equivalent to boxcar filtering twice (or using the corresponding triangle filter) the quad-isolated spectrum Q[n] and dividing it by the TTI spectrum T[n] also boxcar filtered twice, then boxcar filtering the corresponding quotient. Mathematically filtering each of the two spectra Q[n] and T[n] produces smoothed versions of each. Due to mass instability in the final mass analyzer (a TOF analyzer in the present example) due to high voltage noise, etc., and due to stochastic ion arrival times, this allows for the chemical noise spectra to align better. Mathematically filtering the quotient of the two filters out noise that comes from abundance instability in the chemical noise spectra, allowing for a smoother profile window. Note that the value of 750 given above for the mathematical filter width w is but one example, as other values may be suitable. For example, the filter width w may scale with the sampling frequency of the spectral data. The mathematical filtering may be implemented in, for example, PYTHON software. In this case, the infinite summations of the convolution formula simplify to summing shifted copies of data arrays, because the spectra are only nonzero for a finite number of samples. Care should be taken to ensure the absence of zeros in the filtered TTI spectrum. Because the spectrum values are always non-negative, this can be accomplished by adding a small constant offset if needed.

In a more general example, the window profile, P[n], may be expressed as follows:

$$P[n] = \left(\frac{Q[n]*F1[n]}{T[n]*F2[n]}\right)*F3[n],$$

where the value w for the convolutions may be different for the filters F1, F2, and F3.

Also in this example, the filters F1, F2, and F3 may be different from each other as needed. Moreover, the filters F1, F2, and F3 generally may be any type of mathematical filter useful for generating the window profile P[n], for example by providing functionalities such as data smoothing or noise reduction. Further, one or more of the filters F1, F2, and F3 may be applied more than once, as in the case of the boxcar filter B[n] of the previous example.

As shown in FIG. 6B, the chemical noise signals bracketed inside the two edges of the window form a plateau-like band in the profile. Outside the window, the normalization result is close to zero because electronic noises from the ion detectors are significantly less abundant and prevailing than the chemical noises. The drastic changes between plateau and close-zero regions indicate two narrow transitions between inside and outside the window. A settable percentage ratio (e.g., 20%) of the plateau region can be used to compute the m/z values of the window edges, from which the width of the window can also be determined.

In comparison to the conventional scanning method (described in the Background section above), the noise band method disclosed herein may provide one or more of the following advantages: (1) fast speed and high throughput to determine broad band (e.g., the characterization of the quadrupole transmission window may take a few seconds using the noise band method, as compared to several minutes typically required by the conventional method), (2) no requirement for specially designed calibrant solution for broadband isolation, (3) a direct indication for edge locations of a window relative to the targeted m/z value of quadrupole RF/DC setting, and (4) a complete window profile even when the width of a window is numerically larger than the target m/z value of quadrupole RF/DC setting.

Figure 7:
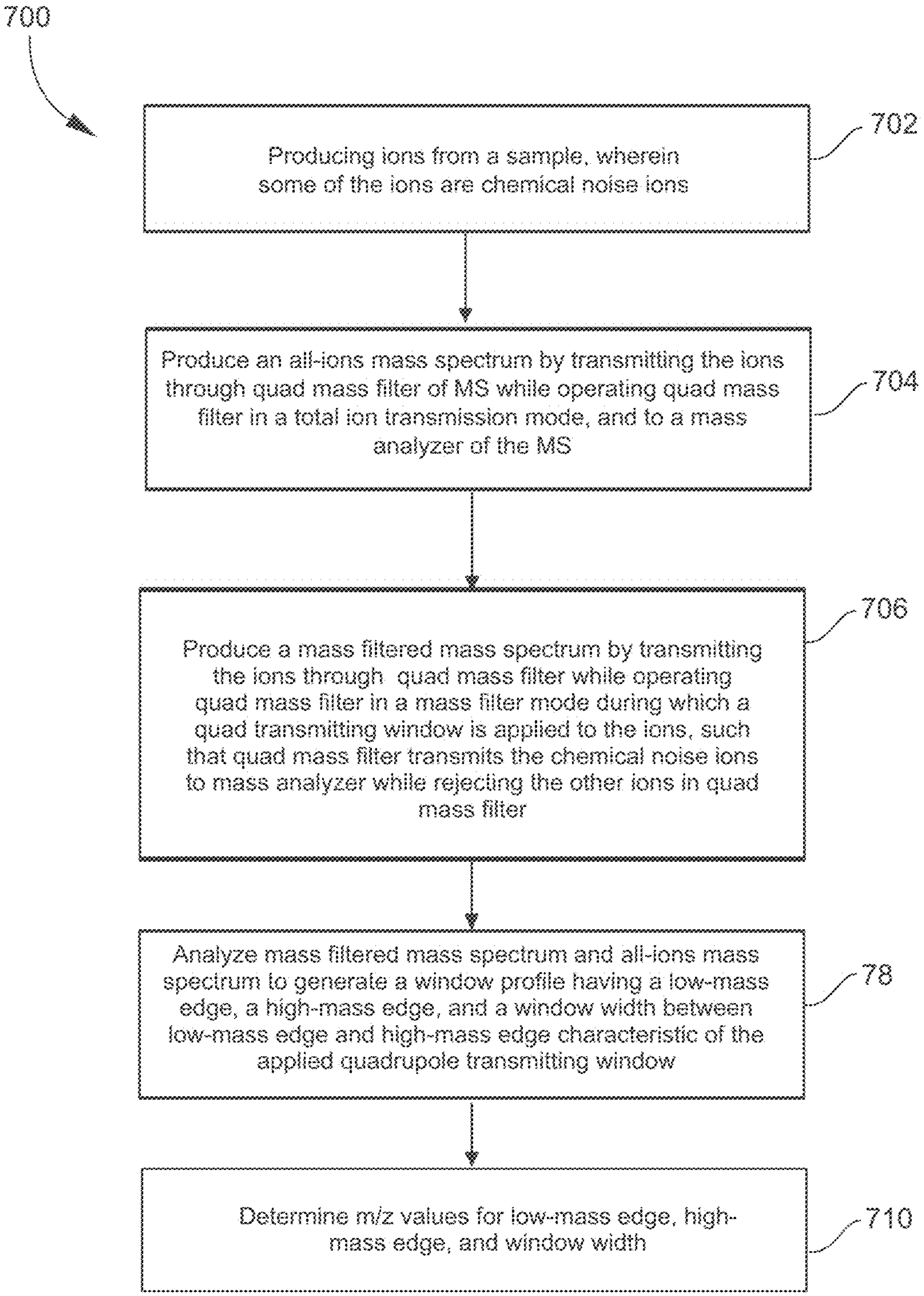
FIG. 7 is a flow diagram illustrating an example of a method for characterizing a quadrupole transmitting window applied by a quadrupole mass filter of a mass spectrometer, according to an embodiment of the present disclosure.

FIG. 7 is a flow diagram 700 illustrating an example of a method for characterizing a quadrupole transmitting window applied by a quadrupole mass filter of a mass spectrometer, according to an embodiment of the present disclosure. In the method, ions are produced from a sample (step 702). Some of the ions are chemical noise ions as described herein. An all-ions mass spectrum is produced by transmitting the ions through the quadrupole mass filter while operating the quadrupole mass filter in a total ion transmission mode, and to a mass analyzer of the mass spectrometer (step 704). A mass filtered mass spectrum is also produced, by transmitting the ions through the quadrupole mass filter while operating the quadrupole mass filter in a mass filter mode during which the quadrupole transmitting window is applied to the ions, such that the quadrupole mass filter transmits the chemical noise ions to the mass analyzer while rejecting the other ions in the quadrupole mass filter (step 706). For example, the quadrupole mass filter may be switched or alternated between the two operational modes, namely the total ion transmission mode and the mass filter mode. The mass filtered mass spectrum and the all-ions mass spectrum are then analyzed to generate a window profile having a low-mass edge, a high-mass edge, and a window width between the low-mass edge and the high-mass edge characteristic of the applied quadrupole transmitting window (step 708). The determining m/z values for the low-mass edge, the high-mass edge, and the window width m/z values for the low-mass edge, the high-mass edge, and the window width are then determined (step 710). The information obtained may then be utilized to tune and calibrate the quadrupole mass filter for subsequent analytical runs.

In an embodiment, the flow diagram 700 may represent an MS system, or part of an MS system, configured to carry out steps 702-710. For this purpose, a controller (e.g., the controller 500 shown in FIGS. 4 and 5) including a processor, memory, and other components as appreciated by persons skilled in the art, may be provided to control the performance of steps 702-710, such as by controlling the components of the MS system involved in carrying out steps 702-710.

EXAMPLES

Table 1 below is a comparison between the conventional scanning method and the noise band method disclosed herein. The test results show a close match in the determination of window width between the two methods.

TABLE 1

| Experiment | window width (amu) scan | window width (amu) noise band |
|---|---|---|
| 1 | 372 | 372 |
| 2 | 306 | 306 |
| 3 | 264 | 264 |
| 4 | 233 | 233 |
| 5 | 210 | 209 |
| 6 | 190 | 190 |
| 7 | 174 | 175 |
| 8 | 162 | 161 |

Figure 8A:
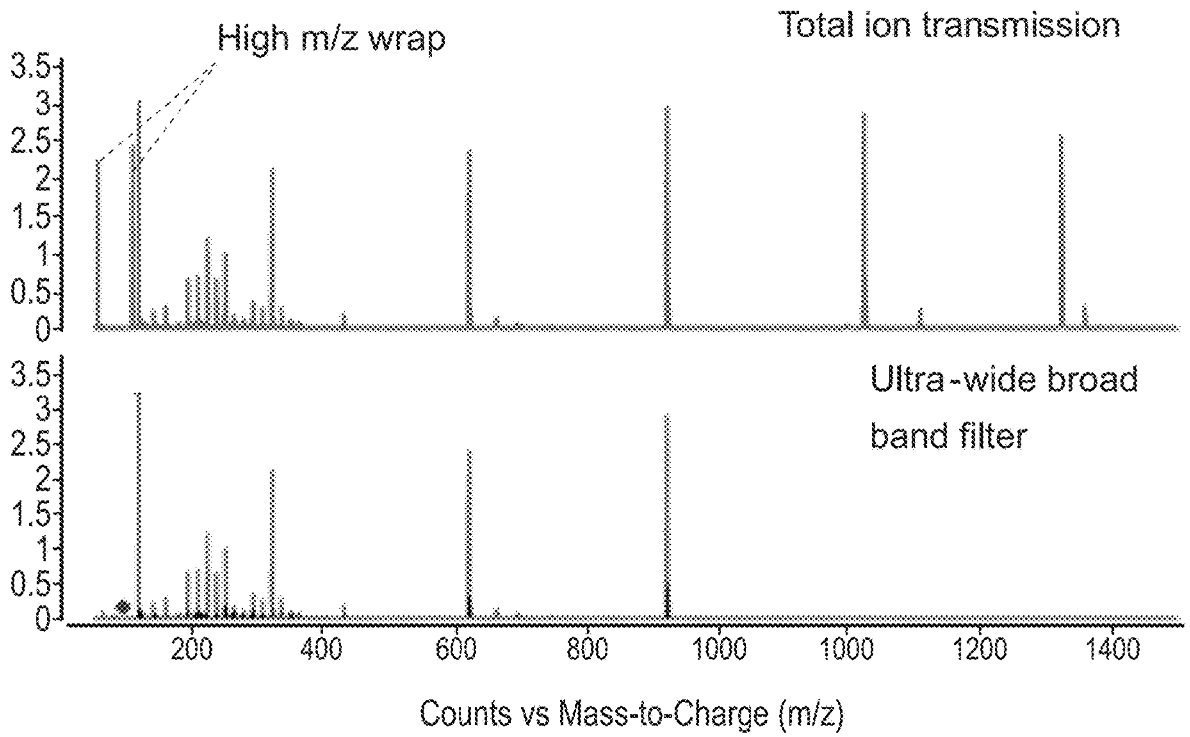
FIG. 8A shows an example of mass spectra (detector counts vs. m/z) acquired while operating a quadrupole mass filter operated in a total ion transmission mode (upper spectrum) and a wide band filter mode (lower spectrum).
Figure 8B:
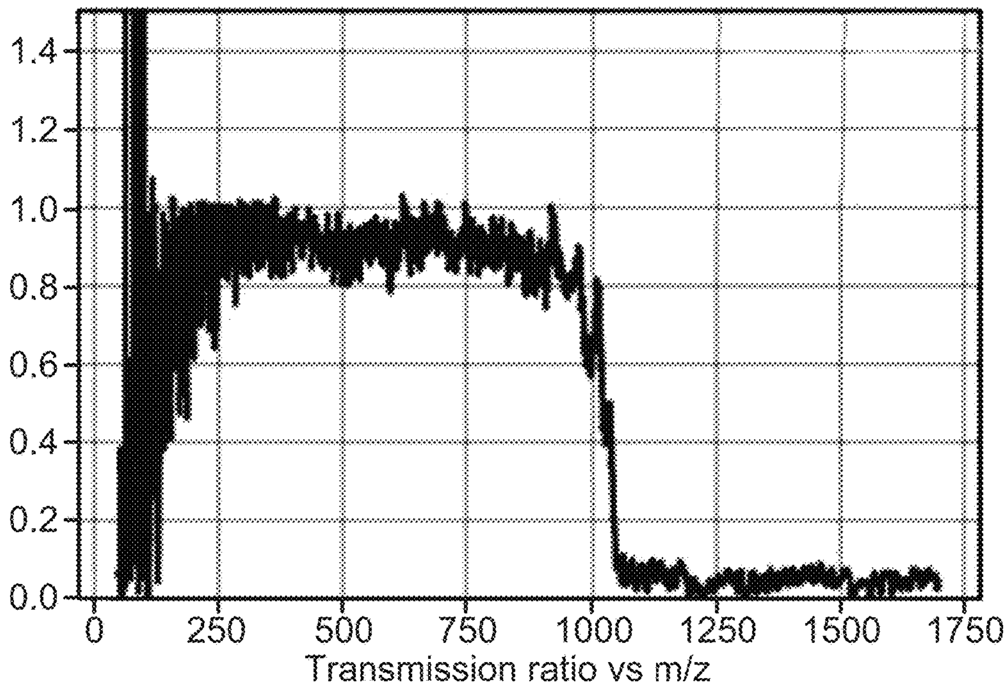
FIG. 8B shows a window profile produced from the spectra of FIG. 8A according to an example of a noise band method disclosed herein.

FIGS. 8A and 8B show the results of processing a calibrant solution in a Q-TOF instrument consistent with the MS system 400 described above and illustrated in FIG. 4. FIG. 7A shows the mass spectra (detector counts vs. m/z) acquired while the quadrupole mass filter was set to the total ion transmission mode (upper spectrum) and while the quadrupole mass filter was set to an ultra-wide band filter mode (lower spectrum). As shown, the ultra-wide bandpass eliminated the high-mass wrap-around ions (upper spectrum) that would otherwise appear in the low m/z region of a spectrum. Wrap-around ions are high-mass ions that enter the flight tube of a TOF analyzer as part of one ion packet injected by the ion pulser, but because of their relatively slow flight speeds, are overtaken by (and thus appear to be low mass ions that are part of) the next ion packet injected into the flight tube. FIG. 8B shows the window profile produced from the spectra of FIG. 8A according to the noise band method disclosed herein. The high m/z edge of the window was accurately characterized by the noise band method. Thus, FIGS. 8 and 8B demonstrate that the noise band method can be utilized to guide the calibration of a quadrupole mass filter to set the appropriate RF/DC parameters to prevent the high m/z ions from entering a TOF analyzer.

As noted above, the ion source utilized in an MS system as disclosed herein may be either an atmospheric pressure ionization (API) source or a vacuum-operated ion source. Examples of API ionization devices include, but are not limited to, sources for spray ionization (e.g., electrospray ionization (ESI), probe electrospray ionization (PESI), desorption electrospray ionization (DESI), solvent-assisted ionization (SAI), matrix-assisted ionization (MAI), thermospray ionization, sonic spray ionization, ultrasonication-assisted spray ionization (UASI), etc.), atmospheric-pressure chemical ionization (APCI), atmospheric-pressure photoionization (APPI), atmospheric-pressure laser desorption ionization (AP-LDI), atmospheric-pressure matrix-assisted laser desorption ionization (AP-MALDI), atmospheric-pressure plasma-based, and ambient ionization. Examples of vacuum-operated ion sources include, but are not limited to, sources for electron ionization or electron impact (EI), chemical ionization (CI), photo-ionization (PI), field ionization (FI), plasma or corona or glow discharge, laser desorption ionization (LDI), and matrix-assisted laser desorption ionization (MALDI).

In addition or as an alternative to collision induced dissociation (CID), an MS system as disclosed herein may include an ion fragmentation device configured to perform another type of ion fragmentation. Examples of other types of ion fragmentation include, but are not limited to, electron capture dissociation (ECD), electron transfer dissociation (ETD), infrared multiphoton dissociation (IRMPD), etc.

As noted above, the final mass analyzer of an MS system as disclosed herein is not limited to being a TOF analyzer. Examples of other types of mass analyzers include, but are not limited to, multipole electrode structures (e.g., quadrupole mass filters, linear quadrupole ion traps, three-dimensional quadrupole ion traps or Paul ion traps, etc.), electrostatic ion traps (e.g. Kingdon, Knight and ORBITRAP® traps), ion cyclotron resonance (ICR) ion traps or Penning ion traps (such as utilized in Fourier transform ion cyclotron resonance mass spectrometry (FT-ICR or FTMS)), electric field sector and/or magnetic field sector instruments, etc. In various embodiments, the final mass analyzer may be a high-resolution mass analyzer. Examples of high-resolution mass analyzers include, but are not limited to, the aforementioned electrostatic ion traps, ICR or Penning ion traps, TOF analyzers, and magnetic field sector instruments (including double-focusing magnetic sector instruments such as, for example, magnetic sector instruments having the standard Nier-Johnson, reverse Nier-Johnson, or Mattauch-Herzog configuration). As another example, a high-resolution mass analyzer is one exhibiting a resolving power $R=m/\Delta m$ of 500 or greater where, according to the "10% valley definition" provided by IUPAC, m is the mass of the ion of interest and $\Delta m$ is the spacing between two peaks of equal intensity with the valley between the two peaks being no more than 10% of their height. See IUPAC, Compendium of Chemical Terminology, $2^{nd}$ ed. (the "Gold Book") (1997).

The ion detector provided in an MS system as disclosed herein may be any device configured for collecting and measuring the flux (or current) of mass-discriminated ions outputted from the final mass analyzer. Examples of an ion detector include, but are not limited to, an electron multiplier (EM), a photomultiplier (PM), a micro-channel plate (MCP) detector, a Faraday cup, etc.

As appreciated by persons skilled in the art, an MS system as disclosed herein may include various other ion optics positioned along the ion path that are not specifically described above or shown in the drawing figures. Such ion optics may be configured for controlling or manipulating (e.g., focusing, shaping, steering, cooling, accelerating, decelerating, slicing, etc.) the ion beam, as appreciated by persons skilled in the art.

The presently disclosed subject matter has been described primarily in the context of MS. More generally, however, the presently disclosed subject matter is applicable to any instrument/method that utilizes a quadrupole mass filter. One example is ion mobility spectrometry (IMS), which is a gas-phase ion separation technique in which ions produced from a sample in an ion source are separated based on their differing mobilities through a drift cell of known length that is filled with an inert gas of known composition and maintained at a known gas pressure and temperature. In low-electric field drift-type IMS, the ions are urged forward through the drift cell under the influence of a relatively weak, uniform DC voltage gradient, for example in a range from 10 V/cm to 20 V/cm. Upon exiting the drift cell, the mobility-separated ions successively reach an ion detector, and their differing arrival times can be correlated to their differing mobilities. The mobility of the ions depends largely on their collision cross-sections (CCSs) (and thus their size and conformation or shape) and charge states (e.g., +1, +2, or +3), and to a much lesser extent on their m/z ratios. Like an MS system, and IMS system may include a quadrupole mass filter positioned in the work flow between the ion source and the ion detector.

Moreover, an IMS system may be coupled online with a mass analyzer, which often is a TOF analyzer. In the combined (or hybrid) IM-MS system, ions are separated by mobility prior to being transmitted into the mass analyzer where they are then mass-resolved. Due to the significant degree of orthogonality between IM-based separation and MS-based separation, performing the two separation techniques in tandem is particularly useful in the analysis of complex chemical mixtures, such as those including high-molecular weight (MW) molecules (e.g., biomolecules), and in separating ions that are different from each other (e.g., in shape) but present overlapping mass peaks.

EXEMPLARY EMBODIMENTS

Exemplary embodiments provided in accordance with the presently disclosed subject matter include, but are not limited to, the following:

1. A method for characterizing a quadrupole transmitting window applied by a quadrupole mass filter of a mass spectrometer, the method comprising: producing ions from a sample, wherein some of the ions are chemical noise ions; producing an all-ions mass spectrum by transmitting the ions through the quadrupole mass filter while operating the quadrupole mass filter in a total ion transmission mode, and to a mass analyzer of the mass spectrometer; producing a mass filtered mass spectrum by transmitting the ions through the quadrupole mass filter while operating the quadrupole mass filter in a mass filter mode during which the quadrupole transmitting window is applied to the ions, such that the quadrupole mass filter transmits the chemical noise ions to the mass analyzer while rejecting the other ions in the quadrupole mass filter; analyzing the mass filtered mass spectrum and the all-ions mass spectrum to generate a window profile having a low-mass edge, a high-mass edge, and a window width between the low-mass edge and the high-mass edge characteristic of the applied quadrupole transmitting window; and determining m/z values for the low-mass edge, the high-mass edge, and the window width.
2. The method of embodiment 1, wherein at least some of the chemical noise ions are produced from trace impurities in the sample.
3. The method of any of the preceding embodiments, wherein the mass analyzer is a high-resolution mass analyzer.
4. The method of any of the preceding embodiments, wherein the mass analyzer is a quadrupole mass analyzer.
5. The method of any of the preceding embodiments, wherein the producing of the all-ions mass spectrum is done two or more times to produce a plurality of all-ions mass spectra, the producing of the mass filtered mass spectrum is done two or more times to produce a plurality of mass filtered mass spectra, and the window profile is generated by analyzing an averaged spectrum of the plurality of all-ions mass spectra and an averaged spectrum of the plurality of mass filtered mass spectra.
6. The method of embodiment 5, comprising operating the quadrupole mass filter alternately between the total ion transmission mode and the mass filter mode to produce the plurality of all-ions mass spectra and the plurality of mass filtered mass spectra.
7. The method of any of the preceding embodiments, wherein the analyzing comprises normalizing the mass filtered mass spectrum by the all-ions mass spectrum.
8. The method of embodiment 7, wherein normalizing the mass filtered mass spectrum by the all-ions mass spectrum produces a normalized mass filtered mass spectrum, and further comprising applying a mathematical filter to the normalized mass filtered mass spectrum.
9. The method of embodiment 8, wherein the mathematical filter is a moving average filter.
10. The method of any of the preceding embodiments, wherein the analyzing comprises applying a mathematical filter to the mass filtered mass spectrum and separately to the all-ions mass spectrum.

11. The method of embodiment 10, wherein the mathematical filter applied to the mass filtered mass spectrum is different from the mathematical filter applied to the all-ions mass spectrum.
12. The method of embodiment 10 or 11, wherein the applying of the mathematical filter comprises applying the mathematical filter to the mass filtered mass spectrum at least twice, and applying the mathematical filter to the all-ions mass spectrum at least twice.
13. The method of any of embodiments 10-12, wherein the analyzing comprises determining a quotient of the mass filtered mass spectrum and the all-ions mass spectrum, and further comprising applying the mathematical filter to the quotient.
14. A mass spectrometry (MS) system, comprising: a quadrupole mass filter; a mass analyzer configured to receive ions from the quadrupole mass filter; an ion detector configured to receive ions from the mass analyzer; and a controller comprising an electronic processor and a memory, and configured to control an operation comprising: producing ions from a sample, wherein some of the ions are chemical noise ions; producing an all-ions mass spectrum by transmitting the ions through the quadrupole mass filter while operating the quadrupole mass filter in a total ion transmission mode, and to the mass analyzer; producing a mass filtered mass spectrum by transmitting the ions through the quadrupole mass filter while operating the quadrupole mass filter in a mass filter mode during which the quadrupole transmitting window is applied to the ions, such that the quadrupole mass filter transmits the chemical noise ions to the mass analyzer while rejecting the other ions in the quadrupole mass filter; analyzing the mass filtered mass spectrum and the all-ions mass spectrum to generate a window profile having a low-mass edge, a high-mass edge, and a window width between the low-mass edge and the high-mass edge characteristic of the applied quadrupole transmitting window; and determining m/z values for the high-mass edge, the low-mass edge, and the window width.
15. The MS system of embodiment 14, wherein the mass analyzer is a high-resolution mass analyzer.
16. The MS system of embodiment 14, wherein the mass analyzer is a quadrupole mass analyzer.
17. The MS system of any of embodiments 14-16, comprising an ion fragmentation device positioned between the quadrupole mass filter and the mass analyzer.
18. The MS system of any of embodiments 14-17, wherein the controller comprises a window characterizing module configured to perform the analyzing and the determining.
19. A non-transitory computer-readable medium, comprising instructions stored thereon, that when executed on a processor, control or perform the steps of the method of any of the preceding embodiments.
20. A mass spectrometry (MS) system, comprising: the computer-readable storage medium of embodiment 19; and a quadrupole mass filter.
21. A method for characterizing a quadrupole transmitting window applied by a quadrupole mass filter of a mass spectrometer, the method comprising: processing a sample in the mass spectrometer to produce an all-ions mass spectrum and a mass filtered mass spectrum from the sample; and determining a window profile of the applied quadrupole transmitting window by performing a mathematical analysis on the mass filtered mass spectrum and the all-ions mass spectrum.
22. The method of embodiment 21, wherein the determining comprises determining a high-mass edge, a low-mass edge, and a window width between the high-mass edge and the low-mass edge characteristic of the applied quadrupole transmitting window.
23. The method of embodiment 22, wherein the performing of the mathematical analysis comprises applying one or more mathematical filters to one or more of: the mass filtered mass spectrum; the all-ions mass spectrum; and a quotient of the mass filtered mass spectrum and the all-ions mass spectrum.
24. The method of any of embodiments 21-23, comprising one or more features of one or more of embodiments 1-20.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the controller 500 schematically depicted in FIGS. 4 and 5. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), application specific integrated circuits (ASICs), or field-programmable gate arrays (FPGAs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the controller 500 schematically depicted in FIGS. 4 and 5), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" or "in electrical communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for determining a quadrupole transmitting window of a quadrupole mass filter of a mass spectrometer, the quadrupole mass filter comprising ion guide electrodes, the method comprising:

producing, by an ion source, ions from introduction of a sample to the ion source, wherein the ions produced from the sample introduction include chemical noise ions;

producing an all-ions mass spectrum by the quadrupole mass filter operating in a total ion transmission mode, wherein, in the total ion transmission mode, potential sources are configured to apply radio-frequency (RF) potentials to the ion guide electrodes, and the quadrupole mass filter transmits the ions to a mass analyzer of the mass spectrometer;

producing a mass filtered mass spectrum from the chemical noise ions by the quadrupole mass filter operating in a mass filter mode, wherein, in the mass filter mode, the potential sources are configured to apply both RF potentials and direct-current (DC) potentials to the ion guide electrodes, and the quadrupole mass filter transmits the chemical noise ions to the mass analyzer while rejecting other ions;

analyzing, by a processor, the mass filtered mass spectrum and the all-ions mass spectrum to generate a window profile related to the chemical noise ions, wherein the window profile includes a low-mass edge, a high-mass edge, and a window width between the low-mass edge and the high-mass edge; and determining, by the processor, mass-to-charge ratio (m/z) values for the low-mass edge, the high-mass edge, and the window width of the window profile, wherein the determined m/z values of the window profile represent characteristics of the quadrupole transmitting window of the quadrupole mass filter and have utility to calibrate the quadrupole transmitting window of the quadrupole mass filter.

2. The method of claim 1, further comprising:

configuring the quadrupole mass filter to operate in an ultra-wide bandpass filter mode.

3. The method of claim 1, wherein the quadrupole mass filter comprises four ion guide electrodes, and wherein, in the mass filter mode of the quadrupole mass filter, the potential sources are configured to apply a first combined RF and DC potentials to a first opposing electrode pair of the four ion guide electrodes and apply a second combined RF and DC potentials to a second opposing electrode pair of the four ion guide electrodes.

4. The method of claim 1, wherein the quadrupole mass filter is configured to switch between operating in the total ion transmission mode to produce the all-ions mass spectrum and operating in the mass filter mode to produce the mass filtered mass spectrum.

5. The method of claim 1, wherein the producing of the all-ions mass spectrum is done two or more times to produce a plurality of all-ions mass spectra, the producing of the mass filtered mass spectrum is done two or more times to produce a plurality of mass filtered mass spectra, and the window profile is generated by analyzing an averaged spectrum of the plurality of all-ions mass spectra and an averaged spectrum of the plurality of mass filtered mass spectra.

6. The method of claim 5, wherein the quadrupole mass filter alternately switches between the total ion transmission mode and the mass filter mode to produce the plurality of all-ions mass spectra and the plurality of mass filtered mass spectra.

7. The method of claim 1, further comprising:

normalizing the mass filtered mass spectrum by the all-ions mass spectrum.

8. The method of claim 7, wherein normalizing the mass filtered mass spectrum by the all-ions mass spectrum produces a normalized mass filtered mass spectrum.

9. The method of claim 8, further comprising: applying a moving average filter to the normalized mass filtered mass spectrum.

10. The method of claim 1, wherein the analyzing comprises applying a mathematical filter to the mass filtered mass spectrum and separately to the all-ions mass spectrum.

11. The method of claim 10, wherein the mathematical filter applied to the mass filtered mass spectrum is different from the mathematical filter applied to the all-ions mass spectrum.

12. The method of claim 10, wherein the applying of the mathematical filter comprises applying the mathematical filter to the mass filtered mass spectrum at least twice, and applying the mathematical filter to the all-ions mass spectrum at least twice.

13. The method of claim 10, wherein the analyzing comprises determining a quotient of the mass filtered mass spectrum and the all-ions mass spectrum, and further comprising applying the mathematical filter to the quotient.

14. A mass spectrometry (MS) system, comprising:

a quadrupole mass filter comprising ion guide electrodes, and configured to operate in an all ion transmission mode or in a mass filter mode, wherein, in the all ion transmission mode, potential sources are configured to apply radio-frequency (RF) potentials to the ion guide electrodes, and, in the mass filter mode, the potential sources are configured to apply both RF potentials and direct-current (DC) potentials to the ion guide electrodes;

a mass analyzer configured to receive ions from the quadrupole mass filter;

an ion detector configured to detect the ions from the mass analyzer; and a controller comprising a processor and a memory, and configured to:

cause an ion source to produce ions from introduction of a sample to the ion source, wherein the ions produced from the sample introduction include chemical noise ions;

produce an all-ions mass spectrum by configuring the quadrupole mass filter to operate in the all ion transmission mode, wherein, in the all ion transmission mode, the quadrupole mass filter transmits the ions to the mass analyzer;

produce a mass filtered mass spectrum from the chemical noise ions by configuring the quadrupole mass filter to operate in the mass filter mode, wherein, in the mass filter mode, the quadrupole mass filter transmits the chemical noise ions to the mass analyzer while filtering ions outside of a mass filter range;

analyze the mass filtered mass spectrum and the all-ions mass spectrum to generate a window profile related to the chemical noise ions, wherein the window profile includes a low-mass edge, a high-mass edge, and a window width between the low-mass edge and the high-mass edge; and determine mass-to-charge ratio (m/z) values for the high-mass edge, the low-mass edge, and the window width of the window profile, wherein the determined m/z values of the window profile represent characteristics of the quadrupole transmitting window of the quadrupole mass filter and have utility to calibrate the quadrupole transmitting window of the quadrupole mass filter.

15. The MS system of claim 14, wherein the quadrupole mass filter is configured to operate in an ultra-wide bandpass filter mode.

16. The MS system of claim 14, wherein the quadrupole mass filter comprises four ion guide electrodes, and wherein, in the mass filter mode of the quadrupole mass filter, the potential sources are configured to apply a first combined RF and DC potentials to a first opposing electrode pair of the four ion guide electrodes and apply a second combined RF and DC potentials to a second opposing electrode pair of the four ion guide electrodes.

17. The MS system of claim 14, wherein the ion detector is configured to detect and record times-of-flight of the ions that arrive at the ion detector from the mass analyzer, and the controller is configured to correlate the recorded times-of-flight with the determined m/z values.

18. The MS system of claim 14, wherein the controller is configured to:

normalize the mass filtered mass spectrum by the all-ions mass spectrum.

19. A non-transitory computer-readable storage medium, storing instructions that when executed on a processor, cause the processor to:

cause an ion source to produce ions from introduction of a sample to the ion source, wherein the ions produced from the sample introduction include chemical noise ions;

produce an all-ions mass spectrum by configuring a quadrupole mass filter of a mass spectrometer to operate in a total ion transmission mode, wherein, in the total ion transmission mode, potential sources are configured to apply radio-frequency (RF) potentials to ion guide electrodes of the quadrupole mass filter, and the quadrupole mass filter transmits the ions to a mass analyzer of the mass spectrometer;

produce a mass filtered mass spectrum from the chemical noise ions by configuring the quadrupole mass filter to operate in a mass filter mode, wherein, in the mass filter mode, the potential sources are configured to apply both RF potentials and direct-current (DC) potentials to the ion guide electrodes, and the quadrupole mass filter transmits the chemical noise ions to the mass analyzer while filtering ions outside of a mass filter range;

analyze the mass filtered mass spectrum and the all-ions mass spectrum to generate a window profile related to the chemical noise ions, wherein the window profile includes a low-mass edge, a high-mass edge, and a window width between the low-mass edge and the high-mass edge; and determine mass-to-charge ratio (m/z) values for the low-mass edge, the high-mass edge, and the window width of the window profile, wherein the determined m/z values of the window profile represent characteristics of the quadrupole transmitting window of the quadrupole mass filter and have utility to calibrate the quadrupole transmitting window of the quadrupole mass filter.

20. The non-transitory computer-readable storage medium of claim 19, wherein the instructions further cause the processor to:

normalize the mass filtered mass spectrum by the all-ions mass spectrum.

* * * * *